United States Patent
Duan et al.

(10) Patent No.: US 12,032,885 B2
(45) Date of Patent: Jul. 9, 2024

(54) MATERIAL-BASED SUBDOMAIN HYBRID CELLULAR AUTOMATA ALGORITHM FOR MATERIAL OPTIMIZATION OF THIN-WALLED FRAME STRUCTURES

(71) Applicant: JIANGSU UNIVERSITY, Zhenjiang (CN)

(72) Inventors: Libin Duan, Zhenjiang (CN); Wei Xu, Zhenjiang (CN); Xing Liu, Zhenjiang (CN); Xin Luo, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 150 days.

(21) Appl. No.: 17/623,617

(22) PCT Filed: Mar. 23, 2021

(86) PCT No.: PCT/CN2021/082325
§ 371 (c)(1),
(2) Date: Dec. 29, 2021

(87) PCT Pub. No.: WO2022/183540
PCT Pub. Date: Sep. 9, 2022

(65) Prior Publication Data
US 2023/0334197 A1    Oct. 19, 2023

(30) Foreign Application Priority Data
Mar. 4, 2021    (CN) .......................... 202110238581.2

(51) Int. Cl.
*G06F 30/23* (2020.01)
*G06F 30/15* (2020.01)
*G06F 119/14* (2020.01)

(52) U.S. Cl.
CPC .............. *G06F 30/23* (2020.01); *G06F 30/15* (2020.01); *G06F 2119/14* (2020.01)

(58) Field of Classification Search
CPC ...... G06F 30/23; G06F 30/15; G06F 2119/14; G06F 30/25; G06F 30/367; G06F 30/398; G06F 2111/00; G06F 2119/22
See application file for complete search history.

(56) References Cited

U.S. PATENT DOCUMENTS

| | | | | |
|---|---|---|---|---|
| 2009/0164178 A1* | 6/2009 | Pydimarry | .............. | G06F 30/15 703/1 |
| 2010/0262406 A1* | 10/2010 | Goel | ....................... | G06F 30/15 703/2 |
| 2017/0255724 A1* | 9/2017 | Roux | ....................... | G06F 30/15 |

FOREIGN PATENT DOCUMENTS

| | | |
|---|---|---|
| CN | 110287512 A | 9/2019 |
| CN | 111753367 A | 10/2020 |
| CN | 112016160 A | 12/2020 |

OTHER PUBLICATIONS

Goetz et al. "Structural Optimization for Blast Mitigation Using HCA" [Report] Contract W56 HZV-08-C-0236, University of Notre Dame and US Army RDECOM-TARDEC [retrieved on Sep. 5, 2023] (Year: 2009).*

(Continued)

*Primary Examiner* — Kamini S Shah
*Assistant Examiner* — Alfred H B Wechselberger
(74) *Attorney, Agent, or Firm* — Bayramoglu Law Offices LLC

(57) ABSTRACT

The present invention provides a material-based subdomain hybrid cellular automata algorithm for solving material optimization of thin-walled frame structures, including an outer loop and an inner loop: the outer loop is to define and update the target cost for the inner loop; the inner loop is to adjust material using a PID control strategy according to the nominal flow stress of a current cell and the nominal flow stress of candidate materials, so that a current cost of the inner loop converges to the target cost. During the execution (Continued)

of the inner loop, the cellular material update rule based on the PID control strategy is employed to update cellular material, to define the candidate material library and the nominal flow stress, to update the nominal flow stress of current cell, to compare the nominal flow stress with the actual flow stress of each material in the candidate material library, to select the candidate material closest to the nominal flow stress as the selected material grade for the current cell and to replace the material parameters of the current cell with the mechanical parameters of the selected material. The present invention can efficiently solve nonlinear the dynamic response optimization problems containing a large number of material variables, significantly improving the robustness of the algorithm.

7 Claims, 15 Drawing Sheets

(56) References Cited

OTHER PUBLICATIONS

Goetz et al. "Structural Topology Optimization for Blast Mitigation Using Hybrid Cellular Automata" Proceedings of the 2009 Ground Vehicle Systems Engineering and Technology Symposium (GVSETS), Aug. 28-20, 2009, Troy, Michigan, USA [retrieved on Sep. 5, 2023] (Year: 2009).*

Li et al. "Crashworthiness Optimization Design of Aluminum Alloy Thin-Walled Triangle Column Based on Bioinspired Strategy" Materials vol. 13, No. 666 [retrieved on Sep. 5, 2023] (Year: 2000).*

Zeng et al. "Topology Optimization of Thin-Walled Structures Under Static/Crash Loading Case in the Hybrid Cellular Automaton Framework" A. Schumacher et al. (eds.), Advances in Structural and Multidisciplinary Optimization; https://doi.org/10.1007/978-3-319-67988-4_119 [retrieved on Sep. 5, 2023] (Year: 2018).*

Patel et al. "Multilevel Crashworthiness Design using a Compliant Mechanism Approach" 47th AIAA/ASME/ASCE/AHS/ASC Structures, Structural Dynamics, and Materials Conference, AIAA 2006-2056 [retrieved on Sep. 5, 2023] (Year: 2006).*

Liu et al. "Optimal Design of Cellular Material Systems for Crashworthiness" . Presented at the SAE 2016 World Congress and Exhibition; https://doi.org/10.4271/2016-01-1396 [retrieved on Sep. 5, 2023] (Year: 2016).*

Ramnath et al. "Multi-Material Topology Optimization in LS-TaSC Using Ordered SIMP Interpolation" 16th International LS-DYNA® Users Conference, Topology and Shape Optimization [retrieved on Sep. 5, 2023] (Year: 2020).*

Wang Guan, et al., Nonlinear Topology Optimization of Continuum Structures Based on HCA Algorithm, China Mechanical Engineering, 2020, pp. 2161-2173, vol. 31, No. 18, China Academic Journal Electronic Publishing House.

Gao Yunkai, et al., A Research on Frontal Crashworthiness Simulation with Beam / Shell Mixed Model in Car-body Concept Design Phase, Automotive Engineering, 2011, pp. 657-663, vol. 33, No. 8, China Academic Journal Electronic Publishing House.

Xiaojun Liu, et al., GB 20071-2006, The protection of the occupants in the event of a lateral collision, National standards of People's Republic of China, 2006, pp. 1-58.

* cited by examiner

MATERIAL-BASED SUBDOMAIN HYBRID CELLULAR AUTOMATA ALGORITHM FOR MATERIAL OPTIMIZATION OF THIN-WALLED FRAME STRUCTURES

TECHNICAL FIELD

The present invention relates to the technical field of crashworthiness optimization of thin-walled frame structures, and specifically to a material-based subdomain hybrid cellular automata algorithm for solving material optimization of thin-walled frame structures.

BACKGROUND

Bodies of car, rail transit and engineering machinery are typical space frame structures assembled by a variety of thin-walled structures of different materials. To use multi-material thin-walled frame structures is an effective way and an inevitable trend to optimize the safety and cost requirements of automotive, rail transit and engineering machinery. To select the best material and to do optimization design of the multi-material thin-walled frame structures can not only improve the mechanical properties (such as crashworthiness) of thin-walled frame structures, but also reduce their costs. The multi-material matching optimization of thin-walled frame structures with considering crashworthiness and cost is a typical nonlinear dynamic response optimization problem including many discrete variables. Due to the high level of non-linearity in the output response of crash simulation and the presence of numerical noise and oscillation, the gradient-based optimization algorithm is difficult to effectively solve the crashworthiness optimization problem of thin-walled frame structures. Evolutionary algorithms usually need to perform thousands of finite element analyses (FEAs), which leads to a very long optimization time. The optimization algorithms based on the surrogate model is the main way to solve the problems mentioned above. However, when the number of design variables is large (such as more than 30 or even more), the optimization efficiency of the optimization algorithm based on the surrogate model will also be greatly reduced.

Hybrid Cellular Automata (HCA) method is a non-gradient heuristic algorithm that can solve nonlinear dynamic response optimization problems including many discrete variables (such as material density or thickness). However, the existing methods are mainly based on the idea of uniform distribution of internal energy density (IED) to update material density or thickness. It is difficult to solve the multi-material optimization problem of thin-walled frame structures with multiple performance constraint functions, and easy to fall into local optimal solution. Presently, few efficient algorithms can be employed to solve the nonlinear dynamic response optimization problem with many material variables in the discrete design space.

SUMMARY

In view of the deficiencies in the prior art, the present invention provides a material-based subdomain hybrid cellular automata algorithm for solving material optimization of thin-walled frame structures which can efficiently solve a nonlinear dynamic response optimization problem with many material variables.

The present invention achieves the technical object mentioned above by the following technical means.

A material-based subdomain hybrid cellular automata (M-SHCA) algorithm for solving material optimization of thin-walled frame structures includes the following steps:

S1. establishing an initial crash finite element model, constructing a subdomain cellular automata model, defining material variables and field variables of thin-walled frame structures, and employing the initial crash finite element model for material and cost optimization;

S2. executing an outer loop: calculating a cell IED and a constraint value at a current design point by FEA, and updating the target cost by the penalty function method according to the extent of the current design point violating the constraint boundary;

S3. executing an inner loop with the following steps:

S3.1. constructing a step IED target (SIED*) function and updating the target IED;

S3.2. updating cell material using material updating rule based on a PID control strategy;

Specifically: defining a candidate material library and a nominal flow stress of each material, updating the nominal flow stress of a current cell, comparing a nominal flow stress with the true flow stress of each material in the candidate material library, selecting a candidate material closest to the nominal flow stress as a selected material of current cell, and replacing material parameters of current cell with the mechanical parameters of the selected material;

S3.3. processing to S4 if an inner loop is convergent, otherwise returning to S3.1;

S4. writing out an optimization result if the global convergence conditions in the outer loop are satisfied, otherwise returning to S2 for updating cell material in the inner loop.

Further, a candidate material library is defined as follows:

$$Mat = \{Mat(1), L, Mat(s), L, Mat(1)\}, 1 \le s \le l$$
$$= \{(\rho_1, E_1, \sigma_{y1}, \sigma_{u1}, \sigma_{f1}, L), L, (\rho_s, E_s, \sigma_{ys},$$
$$\sigma_{us}, \sigma_{fs}, L)L, (\rho_l, E_l, \sigma_{yl}, \sigma_{ul}, \sigma_{fl}, L)\}$$

where, $\rho_s$ is a density of the sth material in the candidate material library; $E_s$ is an elastic modulus of the sth material in the candidate material library; $\sigma_{ys}$ is a yield strength of the sth material in the candidate material library;

$$\sigma_{fs} = \sqrt{\frac{\sigma_{ys}\sigma_{us}}{1+n}}$$

is a flow stress of the sth material in the candidate material library; $\sigma_{us}$ is a tensile strength of the sth material in the candidate material library; $l \ge 2$ is the number of materials in the candidate library.

Furthermore, a nominal flow stress is a non-physical parameter, which is a positive real number. Further, a nominal flow stress of each cell is updated as follows:

$$\sigma'^{(h+1,k)}_{\Omega_{i,j}} = \begin{cases} \sigma^{min}_{\Omega_{i,j}}, & \sigma'^{(h,k)}_{\Omega_{i,j}} + \Delta\sigma'^{(h,k)}_{\Omega_{i,j}} < \sigma^{min}_{\Omega_{i,j}} \\ \sigma'^{(h,k)}_{\Omega_{i,j}} + \Delta\sigma'^{(h,k)}_{\Omega_{i,j}}, & \sigma^{min}_{\Omega_{i,j}} \le \sigma'^{(h,k)}_{\Omega_{i,j}} + \Delta\sigma'^{(h,k)}_{\Omega_{i,j}} \le \sigma^{max}_{\Omega_{i,j}} \\ \sigma^{max}_{\Omega_{i,j}}, & \sigma'^{(h,k)}_{\Omega_{i,j}} + \Delta\sigma'^{(h,k)}_{\Omega_{i,j}} > \sigma^{max}_{\Omega_{i,j}} \end{cases}$$

where, $\sigma'^{(h,k)}_{\Omega_{i,j}}$ is a nominal flow stress of the jth cell in the subdomain $\Omega_i$ in the hth inner loop the kth outer loop;

$\sigma'^{(h+1,k)}_{\Omega_{i,j}}$ is a nominal flow stress of the jth cell in the subdomain $\Omega_i$ in the (h+1)th inner loop and the kth outer loop; $\sigma_{\Omega_{i,j}}^{min}$ and $\sigma_{\Omega_{i,j}}^{max}$ are a minimize value and a maximum value of actual flow stress of the jth cell in the subdomain $\Omega_i$, respectively; $\Delta\sigma'^{(h,k)}_{\Omega_{i,j}}$ is a nominal flow stress variation of the jth cell in the subdomain $\Omega_i$ in the hth inner loop and the kth outer loop:

$$\Delta\sigma'^{(h,k)}_{\Omega_{i,j}} = (\sigma_{\Omega_{i,j}}^{max} - \sigma_{\Omega_{i,j}}^{min}) f(e_{\Omega_{i,j}}^{(h,k)})$$

where, $e_{\Omega_{i,j}}^{(h,k)}$ denotes a difference between the current IED $S_{\Omega_{i,j}}^{(k)}$ and a target IED $S_m^{*(h,k)}$, and a PID control function for updating the nominal flow stress $f(e_{\Omega_{i,j}}^{(h,k)})$ given as follows:

$$f\left(e_{\Omega_{i,j}}^{(h,k)}\right) = K_p e_{\Omega_{i,j}}^{(h,k)} + K_i\left[e_{\Omega_{i,j}}^{(h,k)} + \sum_{\tau=1}^{k-1} e_{\Omega_{i,j}}^{(\tau)}\right] + K_d\left[e_{\Omega_{i,j}}^{(h,k)} - e_{\Omega_{i,j}}^{(k-1)}\right]$$

where, $K_p$ is a proportional control coefficient; $K_i$ is an integral control coefficient; $K_d$ is a differential control coefficient; $e_{\Omega_{i,j}}^{(\tau)}$ is a relative deviation item of the $\tau$th outer loop; $e_{\Omega_{i,j}}^{(k-1)}$ is a relative deviation item of the (k−1)th outer loop.

Furthermore, the following equation is used to select a candidate material closest to the nominal flow stress as the selected material of the current cell by comparing the nominal flow stress with the true flow stress of each material in the candidate material library:

$$\begin{cases} \sigma'^{(h+1,k)}_{\Omega_{i,j}} - \sigma_{fp} = \min\left(\sigma'^{(h+1,k)}_{\Omega_{i,j}} - \sigma_{f1}, L, \sigma'^{(h+1,k)}_{\Omega_{i,j}} - \sigma_{fs}, L, \sigma'^{(h+1,k)}_{\Omega_{i,j}} - \sigma_{fl}\right) \\ \sigma'^{(h+1,k)}_{\Omega_{i,j}} = \sigma_{fp} \\ Mat^{(h+1,k)}_{\Omega_{i,j}} = Mat(p) \end{cases}$$

where, p denotes a position of the selected material in the candidate material library; $\sigma_{fp}$ is an actual flow stress of the selected material; $\sigma_{\Omega_{i,j}}^{(h+1,k)}$ is an actual flow stress of the jth cell in the subdomain $\Omega_i$ in the (h+1)th inner loop and the kth outer loop; Mat(p) denotes a selected material; $Mat_{\Omega_{i,j}}^{(h+1,k)}$ denotes a selected material of the jth cell in the subdomain $\Omega_i$ in the (h+1)th inner loop and the kth outer loop; $\sigma_s$ is a flow stress of the sth material in the candidate material library.

Further, the following equation is employed to replace material parameters of a current cell with mechanical parameters of selected material:

$$\begin{pmatrix} \rho^{(h+1,k)}_{\Omega_{i,j}} \\ E^{(h+1,k)}_{\Omega_{i,j}} \\ \sigma^{(h+1,k)}_{y,\Omega_{i,j}} \\ \sigma^{(h+1,k)}_{u,\Omega_{i,j}} \\ \sigma^{(h+1,k)}_{f,\Omega_{i,j}} \\ L \end{pmatrix} = \begin{pmatrix} \rho_p \\ E_p \\ \sigma_{yp} \\ \sigma_{up} \\ \sigma_{fp} \\ L \end{pmatrix}$$

where, $\rho_{\Omega_{i,j}}^{(h+1,k)}$ is a material density of the jth cell in the subdomain $\Omega_i$ in the (h+1)th inner loop and the kth outer loop; $E_{\Omega_{i,j}}^{(h+1,k)}$ is an elastic modulus of the jth cell in the subdomain $\Omega_i$ in the (h+1)th inner loop and the kth outer loop; $\sigma_{y,\Omega_{i,j}}^{(h+1,k)}$ is a yield tress of the jth cell in the subdomain $\Omega_i$ in the (h+1)th inner loop and the kth outer loop; $\sigma_{u,\Omega_{i,j}}^{(h+1,k)}$ is a tensile strength of the jth cell in the subdomain $\Omega_i$ in the (h+1)th inner loop and the kth outer loop; $\sigma_{f,\Omega_{i,j}}^{(h+1,k)}$ is a flow stress of the jth cell in the subdomain $\Omega_i$ in the (h+1)th inner loop and the kth outer loop; $\rho_p$ is a material density of a selected material; $E_p$ is an elastic modulus of the selected material; $\sigma_{yp}$ is a yield tress of the selected material; $\sigma_{up}$ is a tensile strength of the selected material; $\sigma_{fp}$ is a flow stress of the selected material; $\sigma_{up}$ is a tensile strength of selected material; $\sigma_{fp}$ is a flow stress of selected material.

Furthermore, global convergence conditions comprise:

$$|C^{(h,k)} - C^{*(k)}| < \varepsilon_1 \text{ or } k_1 \geq k_{1max}$$

where, $$C^{(h,k)} = \sum_{i=1}^{I} \sum_{j=1}^{N} C_{\Omega_{i,j}}^{(h,k)}$$

is a total cost in the hth inner loop and the kth outer loop, here $C_{\Omega_{i,j}}^{(h,k)}$ is a cell cost in the hth inner loop and the kth outer loop; $C^{*(k)}$ is a target cost defined in the kth outer loop; $\varepsilon_1$ is an inner loop convergence factor; $k_1$ is the number of iterations in the inner loop; $k_{1max}$ is a maximum number of iterations in the inner loop; a cell cost of the selected material of the jth cell in the subdomain $\Omega_i$ in the (h+1)th inner loop and the kth outer loop $C_{\Omega_{i,j}}^{(h+1,k)}$ is calculated as follows:

$$C_{\Omega_{i,j}}^{(h+1,k)} = \xi_{\Omega_{i,j}}^{(h+1,k)} \rho_{\Omega_{i,j}}^{(h+1,k)} t_{\Omega_{i,j}} A_{\Omega_{i,j}}$$

where, $\xi_{\Omega_{i,j}}^{(h+1,k)}$ is a price of the selected material of the jth cell in the subdomain $\Omega_i$ in the (h+1)th inner loop and the kth outer loop, $\rho_{\Omega_{i,j}}^{(h+1,k)}$ is a density of the selected material of the jth cell in the subdomain $\Omega_i$ in the (h+1)th inner loop and the kth outer loop, $t_{\Omega_{i,j}}$ is a thickness of the jth cell in the subdomain $\Omega_i$, and $A_{\Omega_{i,j}}$ is an area of the jth cell in the subdomain $\Omega_i$.

The material-based subdomain hybrid cellular automata method for solving the material optimization of thin-walled frame structures includes the modelling module for constructing the initial collision finite element model and subdomain cellular automaton model of thin-walled frame structures and the loop module for executing the outer and inner loops.

An electronic device including a processor and a memory, in which the memory is used to store computer-readable code; the processor is used to execute the computer-readable code and implement a subdomain hybrid cellular automata method for optimizing the material of a thin-walled framework structure when executing the computer-readable code.

A computer-readable storage medium, characterized in that the computer-readable storage medium stores computer-readable code, which, when executed by a processor, enables the processor to implement a sub region HCA method for optimizing thin-walled framework structural materials.

The present invention has the following beneficial effects:
(1) The inner loop introduces the nominal flow stress in the present invention which converts discrete material variables into continuous variables, and then the cell material updating rule based on a PID control strategy is used to realize the iterative updating of cell material and improve the robustness of the M-SHCA algorithm.
(2) The M-SHCA algorithm can solve nonlinear dynamic response optimization problems containing many material variables which not only has high searching efficiency (less computational resources and less finite element simulations), but also has good global convergence accuracy.

(3) The present invention introduces the concept of subdomain cellular automata model based on the topological structural characteristics of thin-walled frame structure to solve the nonlinear dynamic response optimization problems in a discrete design space.

(4) A step target IED update rule is used in the present invention to update the cell material in the inner loop, thereby improving the global optimal solution searching ability of the M-SHCA algorithm.

(5) Gradient information is not necessary to be calculated during the optimization process of the present invention, which has a great advantage in solving complex nonlinear problems where sensitivity information is hard to obtain.

DETAILED DESCRIPTION OF THE EMBODIMENTS

The present invention is further illustrated below with reference to the accompanying drawings and specific embodiments, but the protection scope of the present invention is not limited thereto.

Figure 1:
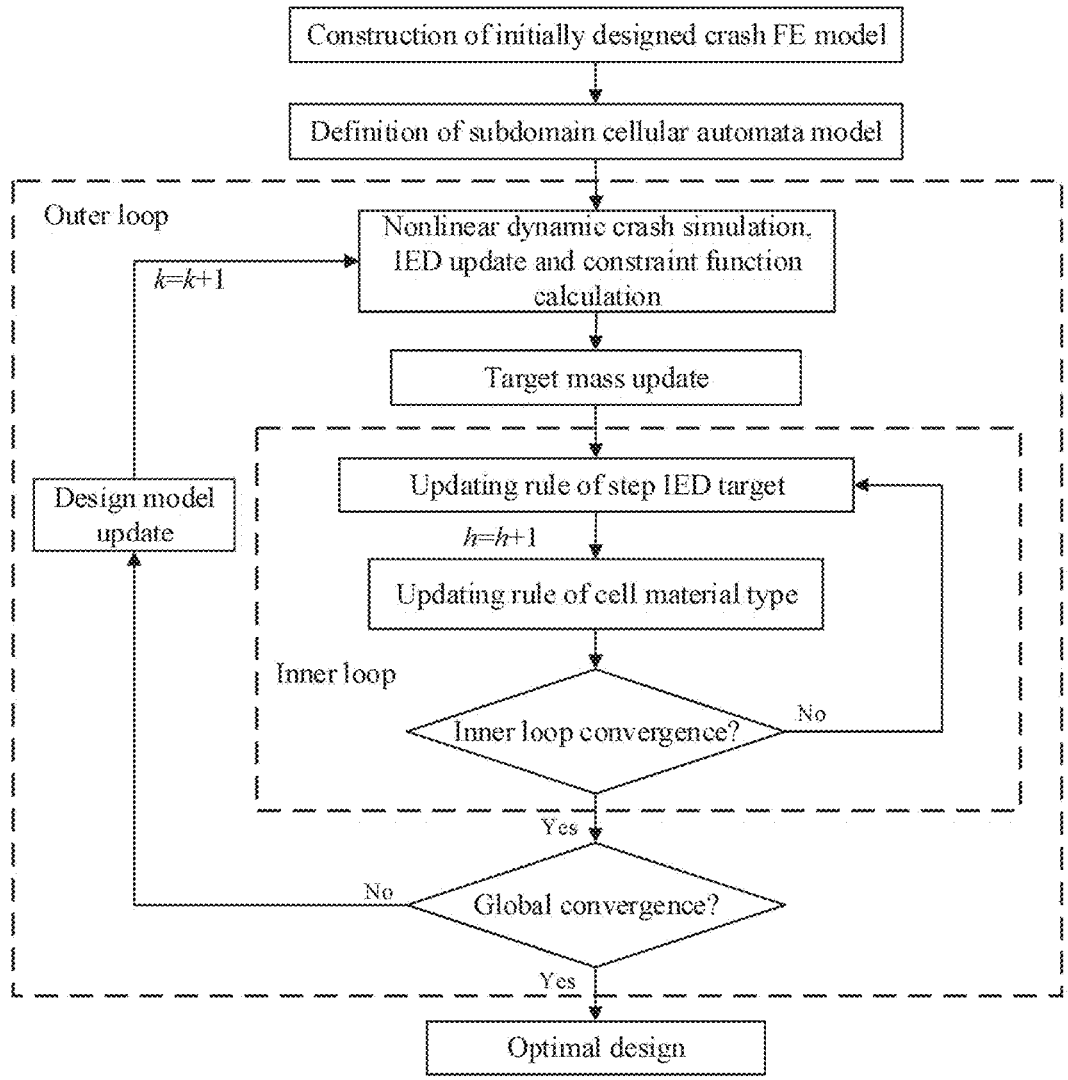
FIG. 1 is a flowchart of the M-SHCA algorithm for solving material optimization of thin-walled frame structure in the present invention.

As shown in FIG. 1, a material-based subdomain hybrid cellular automata(M-SHCA) algorithm for solving material optimization of thin-walled frame structures specifically includes the following steps:

S1: An initial crash finite element model of a thin-walled frame structures is established for the material and cost optimization of thin-walled frame structure;

A finite element preprocessor software is used to discrete a full-vehicle geometric model into its finite element meshes, and then assign attributes, materials, boundary conditions and initial conditions for each part of the finite element meshes to complete the full-vehicle crash finite element model for the material and cost optimization of thin-walled frame structures.

Figure 2:
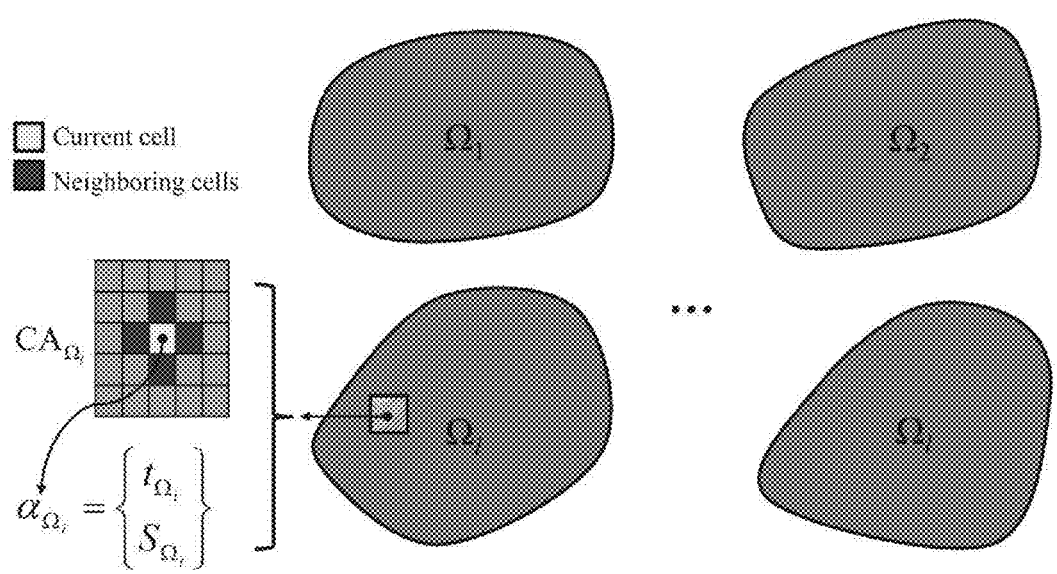
FIG. 2 is a schematic diagram of the definition of a subdomain cellular automata (SCA) model in the present invention.

S2: A subdomain cellular automata model of thin-walled frame structures is established and its material variables and field variables are defined;

The concept of "subdomain Cellular Automata (CA) model" is introduced in a discrete design space based on a conventional CA model, as shown in FIG. 2. Assume that a global design space $\Omega$ is fragmented into l discrete subdomains $\Omega_i (i=1,2,L,\ldots l)$ and each subdomain $\Omega_i$ is described by a cellular automata model $CA_{\Omega_i}$ and a cell state $\alpha_{\Omega_i}$ by the following mathematical expression:

$$\Omega(CA_\Omega,\alpha_\Omega)=\Omega_1(CA_{\Omega_1},\alpha_{\Omega_1})+\Omega_2(CA_{\Omega_2},\alpha_{\Omega_2})+L+\Omega_i(CA_{\Omega_1},\alpha_{\Omega_1})+L+\Omega_l(CA_{\Omega_l},\alpha_{\Omega_l}) \quad (1)$$

where $\Omega_i$ denotes an ith subdomain of the global design space $\Omega$, $\alpha_{\Omega_i}$ denotes a cell state of the ith subdomain, $CA_{\Omega_i}$ is the cellular automata model of the ith subdomain, which is consisted of a current cell and its neighboring cells thereof, and the cell type maybe one-dimensional cellular automata, two-dimensional cellular automata, and three-dimensional cellular automata.

As shown in FIG. 2, a jth cell state $\alpha_{\Omega_{i,j}}$ in the ith subdomain $\Omega_i$ is described by the following equation:

$$\alpha_{\Omega_{i,j}} = \begin{Bmatrix} Mat_{\Omega_{i,j}} \\ S_{\Omega_{i,j}} \end{Bmatrix} \quad (2)$$

in which, $\text{Mat}_{\Omega_{i,j}}$ is a design variable (such as, part material) of a jth cell in the ith subdomain $\Omega_i$; $S_{\Omega_{i,j}}$ is a field variable (such as, part IED) of a jth cell in the ith subdomain $\Omega_i$, calculated as follows:

$$S_{\Omega_{i,j}} = \frac{1}{\hat{N}_{\Omega_{i,j}} + 1} \sum_{n \in N_{\Omega_{i,j}}} \frac{U_{\Omega_{i,n}}}{t_{\Omega_{i,n}} \cdot A_{\Omega_{i,n}}} \quad (3)$$

Wherein, $U_{\Omega_{i,n}}$ is an internal energy of the nth cell in the ith subdomain $\Omega_i$, $t_{\Omega_{i,n}}$ and $A_{\Omega_{i,j}}$ are respectively a thickness and a surface area of the nth cell in the ith subdomain $\Omega_i$, $N_{\Omega_{i,j}}$ is a set of the neighboring cells of the jth cell in the ith subdomain $\Omega_i$, $S_{\Omega_{i,j}}$ is a local IED of the jth cell in the ith subdomain $\Omega_i$, namely, the field variable, and $\hat{N}_{\Omega_{i,j}}$ denotes the number of cells in the collection.

S3: The process enters an outer loop, the finite element analysis software, such as LS-DYNA, Radioss, Abaqus or Ansys, is invoked to conduct a nonlinear dynamic crash simulation analysis, a cell IED and a constraint function value at a current design point are accessed from the simulation result, and a target cost is updated by a penalty function method according to an extent to which the current design point violates a constraint boundary;

A main purpose of the outer loop is to carry out finite element simulation analysis, calculate an output response, and update an IED and a target cost:

S3.1: The IED updating rule

To improve the stability for updating the cell material and avoid the oscillation in the outer loop, an IED $S_{\Omega_{i,j}}^{(k)}$ is updated with the weighted IEDs of the last three iterations in the outer loop:

$$\begin{cases} \hat{S}_{\Omega_{i,j}}^{(1)} = S_{\Omega_{i,j}}^{(1)}, & k=1 \\ \hat{S}_{\Omega_{i,j}}^{(2)} = \frac{1}{2} S_{\Omega_{i,j}}^{(1)} + \frac{1}{2} S_{\Omega_{i,j}}^{(2)}, & k=2 \\ \hat{S}_{\Omega_{i,j}}^{(k)} = \frac{1}{2} S_{\Omega_{i,j}}^{(k)} + \frac{1}{3} S_{\Omega_{i,j}}^{(k-1)} + \frac{1}{6} S_{\Omega_{i,j}}^{(k-2)}, & k \geq 3 \end{cases} \quad (4)$$

S3.2: A Target cost updating rule

When multiple performance constraint functions exist in the outer loop, a target cost updating rule is proposed based on the penalty function method, in which the penalty value of a target cost $\Delta C^{*(k)}$ is used to indicate an extent to a current design point violating the constraint boundary in the kth outer loop and then the target cost is updated in the kth outer loop. The penalty value of the target cost $\Delta C^{*(k)}$ is calculated as follows:

$$\Delta C^{*(k)} = \min\left(\max\left(K_q C^{*(0)} \delta^{(k)}, -\Delta C\right), \Delta C\right) \quad (5)$$

$$\delta^{(k)} = \sum_{i=1}^{n_g} \frac{O_i^{(k)} - O_i^*}{O_i^*} \quad (6)$$

in which, $n_g$ is the number of constraint functions, $K_q$ is a scale factor of the penalty value of the target cost, $O_i^{(k)}$ is a response of the ith constraint function in the kth outer loop, $O_i^*$ is a specified boundary condition of the ith constraint function, $\delta^{(k)}$ is a relative deviation between $n_g$ constraint functions and a specified boundary condition, $C^{*(0)}$ denotes an initial total cost of thin-walled frame structures, $\Delta C$ denotes a maximum penalty of the target cost.

Then a target cost $C^{*(k)}$ in the kth outer loop is updated by the following equation:

$$C^{*(k)} = \min(C^{*(k-1)} + \Delta C^{*(k)}, C^{*(k')}) \quad (7)$$

in which, k' denotes the position of the last feasible solution in the outer loop iterations. If there is no feasible solution in the outer loop iterations until current design point, k' will vanish (k'=0).

To improve the convergence efficiency of the M-SHCA algorithm, $p_f$ is defined to indicate the iteration number for the consecutive infeasible solutions, of which an initial value is set to be zero; $p^*_f$ is defined to indicate the maximum iteration number for the consecutive infeasible solutions. If the current design point is a feasible solution during iterations, $p_f$=0; if the current design point is an infeasible solution, $p_f$=$p_f$+1. If the iteration number for the consecutive infeasible solutions is greater than the maximum iteration number for the consecutive infeasible solutions ($p_f > p^*_f$), the M-SHCA algorithm will be convergent and the iterations of the M-SHCA algorithm will be terminated.

Figure 3:
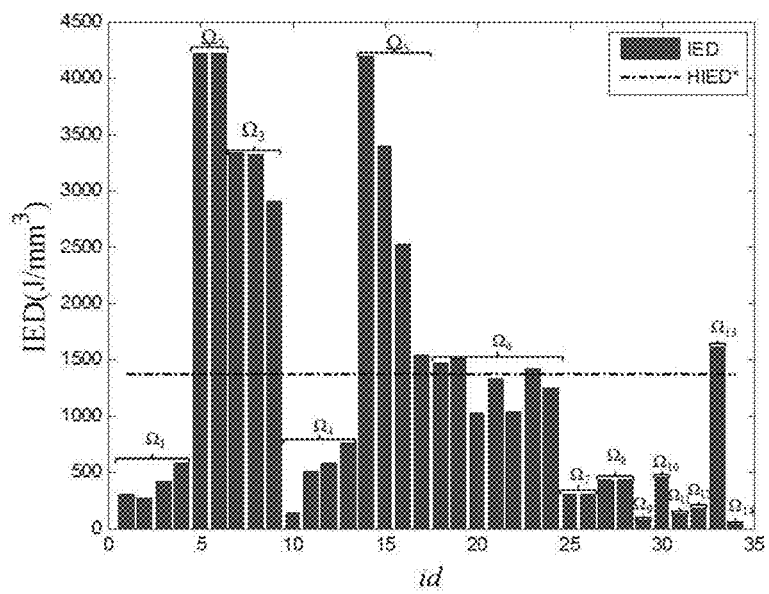
FIG. 3 is a schematic diagram of a horizontal internal energy density target (HIED*) function in the present invention.

S4: The process enters an inner loop, and the following steps are performed:

S4.1: A step target internal energy density function (step IED target, SIED*) is constructed, and a target internal energy density is updated;

As shown in FIG. 3, a so-called horizontal IED target (HIED*) function is employed to update the cell material which will keep increasing to an upper limit for the cells in the high IED subdomains or decreasing to a lower limit for the cells in the low IED regions. However, the IEDs in the whole design space are still very difficult to converge to HIED*. So, we construct a step IED target (SIED*) function with the IED targets of different subdomains calculated adaptively by the cells' IED distribution. Specifically, according to the cells' IED distribution, multiple "step points" and "step intervals" are adaptively defined and a reasonable IED target is calculated for each "step interval", in which the cell material is updated by the SIED* function, and the searching robustness of the global optimal solution is improved.

A side collision simulation of car body frames is employed to exemplify the construction and the updating rule of the SIED* function:

S4.1.1: Cell index definition

An index id of the cell $\Omega_{i,j}$ with its subscripts i and j is defined by equation (8), that is, id is a function about the subscripts i and j of the cell $\Omega_{i,j}$, and then $S_{id(i,j)}^{(k)} = S_{\Omega_{i,j}}^{(k)}$, $$id(i,j) = \hat{N}_{\Omega_{i-1}} * (i-1) + j, \ (j \in [1, \hat{N}_{\Omega_i}], \ \hat{N}_{\Omega_0} = 0) \quad (8)$$

in which, $\hat{N}_{\Omega_{i-1}}$ is the number of cells in the (i−1)th subdomain. A specific case about the cell index definition is given in TABLE 1.

TABLE 1

Correspondence relationship between the cell $\Omega_{i,j}$ and its index

| Cell | $\Omega_{1,1}$ | $\Omega_{1,2}$ | $\Omega_{1,3}$ | $\Omega_{1,4}$ | $\Omega_{2,1}$ | $\Omega_{2,2}$ | $\Omega_{3,1}$ | ... | $\Omega_{11,1}$ | $\Omega_{12,1}$ | $\Omega_{13,1}$ | $\Omega_{14,1}$ |
|---|---|---|---|---|---|---|---|---|---|---|---|---|
| Index | 1 | 2 | 3 | 4 | 5 | 6 | 7 | ... | 21 | 32 | 33 | 34 |

S4.1.2: All cells are traversed, and the differences between the $S_{id}^{(k)}$ of each cell and an average IED $\overline{S}^{(k)}$ of all cells in the kth outer loop are calculated:

$$\Delta S_{id}^{(k)} = S_{id}^{(k)} - \overline{S}^{(k)} \quad (9)$$

where, $$\overline{S}^{(k)} = \frac{1}{\sum_{i=1}^{l} \hat{N}_{\Omega_i}} \sum_{i=1}^{l} \sum_{j=1}^{\hat{N}_{\Omega_i}} S_{\Omega_i,j}^{(k)}$$

is an average IED of all cells in the kth outer loop.

S4.1.3: Determination of "step points" and "step ranges"

All cells are traversed to judge whether equation (10) is satisfied. A subscript id of $\Delta S_{id}^{(k)}$ is defined as a "step point" and denoted as $id_i$ if equation (10) is satisfied. The m "step points" determined by equation (10) can construct m+1 "step ranges" denoted as $[id_{i-1}, id_i]$, where $$i = 1, \ldots, m+1, id_0 = 1, id_{m+1} \sum_{i=1}^{l} \hat{N}_{\Omega_i}.$$

$$\Delta S_{id}^{(k)} * \Delta S_{id+1}^{(k)} < 0 \quad (10)$$

S4.1.4: Update of "step points" and "step ranges"

A width threshold of the "step range" is defined as $H_{threshold}$. All "step ranges" are traversed to judge whether equation (11) is satisfied. If equation (11) is satisfied (that is, the width of "step range" $[id_{i-1}, id_i]$ is very small), the "step points" are deleted and the "step ranges" are updated in the following manner: when i=1, a "step point" $id_1$ is deleted, the "step range" is updated from $[id_0, id_1]$ to $[id_0, id_2]$; when i>1, a "step point" $id_{i-1}$ is deleted, and the "step range" is updated from $[id_{i-1}, id_i]$ to $[id_{i-2}, id_i]$. The original "step points" and "step ranges" are retained if equation (11) is not satisfied. If the number of the updated "step points" is m', the number of the updated "step ranges" is m'+1.

$$id_{i-1} - id_i + 1 < H_{threshold} \quad (11)$$

S4.1.5: A step target IED function is constructed as follows:

$$S^{*(h,k)} = \begin{cases} S_1^{*(h,k)}, & 1 \le id \le id_1 \\ S_2^{*(h,k)}, & id_1 \le id \le id_2 \\ \ldots \\ S_i^{*(h,k)}, & id_{i-1} \le id \le id_i \\ \ldots \\ S_{m'}^{*(h,k)}, & id_{m'-1} \le id \le id_{m'} \\ S_{m'+1}^{*(h,k)}, & id_{m'} \le id \le \sum_{i=1}^{l} \hat{N}_{\Omega_i} \end{cases} \quad (12)$$

where, $S_i^{*(h,k)}$ is a target IED in the "step range" $[id_{i-1}, id_i]$ in the kth outer loop and the hth inner loop.

S4.1.6: Update of the step target IED function

To achieve the specified target mass in the outer loop, a target IED of each "step range" in the inner loop is updated according to equation (13):

$$S_i^{*(h+1,k)} = S_i^{*(h,k)} \frac{C^{(h,k)}}{C^{*(k)}} \quad (13)$$

where, $C^{*(k)}$ denotes a target cost updated in the kth outer loop, $C^{(h,k)}$ denotes a current cost updated in the kth outer loop and the hth inner loop. An initial target IED $S_i^{*(0,k)}$ of each "step range" when the process enters the inner loop is calculated by equation (14):

$$S_i^{*(0,k)} = \begin{cases} \overline{S}_i^{(k)}, & \overline{S}_i^{(k)} \ge \overline{S}^{(k)} * V_{threshold} \\ \overline{S}^{(k)}, & \overline{S}_i^{(k)} < \overline{S}^{(k)} * V_{threshold} \end{cases} \quad (14)$$

Where, $V_{threshold}$ is a target IED threshold coefficient in the "step range", $\overline{S}^{(k)}$ is an average IED of all cells in the kth outer loop; $\overline{S}_i^{(k)}$ is an average IED of all cells in the "step range" $[id_{i-1}, id_i]$ (i=1, ..., m+1), obtained by equation (15):

$$\overline{S}_i^{(k)} = \frac{1}{id_{i+1} - id_i + 1} \sum_{i'=id_i}^{id_{i+1}} S_{i'}^{(k)} \quad (15)$$

Figure 4A:
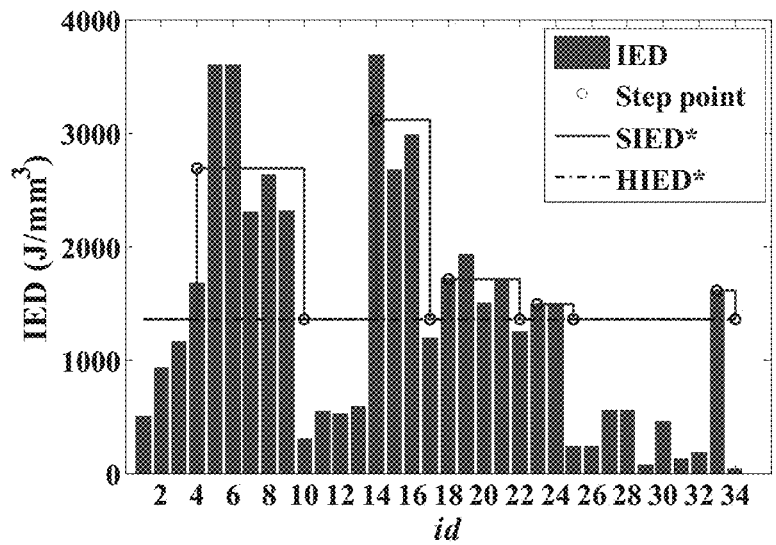
FIG. 4A is a schematic diagram of a step target IED function when $H_{threshold}=0$ and $V_{threshold}=1$ in the present invention.
Figure 4B:
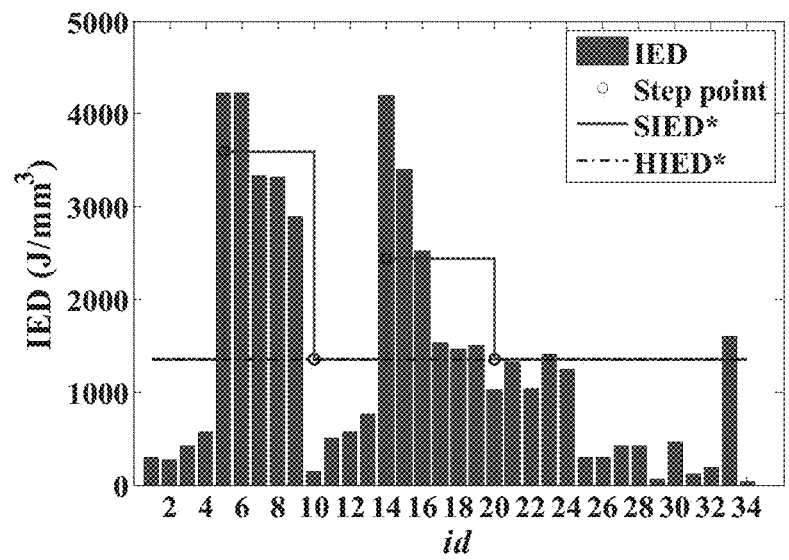
FIG. 4B is a schematic diagram of a step target IED function when $H_{threshold}=3$ and $V_{threshold}=1.1$ in the present invention.

A schematic diagram of the step target IED function constructed by the above steps is shown in FIGS. 4A-4B. A step target IED function of $H_{threshold}=0$ and $V_{threshold}$ is shown in FIG. 4A, and a step target IED function of $H_{threshold}=3$ and $V_{threshold}=1.1$ is shown in FIG. 4B.

S4.2: Cell material updating rule based on a PID control strategy

A cell material updating rule with a certain control strategy is to make a current cost in the inner loop converged to a target cost. The larger the flow stress of the cell material, the more difficult thin-walled frame structure is to deform in the local region, and the smaller its IED. Conversely, the smaller the flow stress of the cell material, the more easily thin-walled frame structure is to deform in the local region, and the larger its IED. A current IED of each cell is compared with the value of the SIED* function to make the current cost of the inner loop converge to the target cost: if the cell IED is lower than the SIED*, the cell material should be changed to the material with a lower flow stress.

The energy absorption capacity of thin-walled frame structures is dependent of the geometrical characteristics and material properties, in which, the key indicators affecting material properties include yield strength, tensile strength, hardening index and so on. The flow stress calculated by equation (16) can be generally employed to measure the overall material strength, which is adopted as a basis to select material.

$$\sigma_f = \sqrt{\frac{\sigma_y \sigma_u}{1+n}} \quad (16)$$

where, $\sigma_y$ is a yield strength, $\sigma_u$ is a tensile strength, and n=0.1 is a hardening index.

Since body material is a discrete variable, its optimization design belongs to the optimization problem with discrete variable. In addition, a specified material normally has an assured combination of different material parameters. Therefore, large amount of complex relationships among material parameters would also be introduced, which would no doubt lead to a high computational complexity of the optimization problems. To handle the difficulties mentioned above, A so-called nominal flow stress (continuous variable) is defined and updated by equations (17)-(20), which is compared with the actual flow stress of the candidate material in turn. Then the candidate material, of which the actual flow stress is closest to the nominal flow stress, is selected as the material of current cell. Finally, the material parameters of the current cell are replaced by the mechanical parameters of the selected material, i.e., density, elastic modulus, yield stress and so on.

The specific steps of cell material update are listed as follows:

S4.2.1: Definition of candidate material library and nominal flow stress

A candidate material library of l(l≥2) materials is defined as follows:

$$Mat = \{Mat(1), L, Mat(s), L, Mat(l)\}, 1 \leq s \leq l$$
$$= \{(\rho_1, E_1, \sigma_{y1}, \sigma_{u1}, \sigma_{f1}, L), L, (\rho_s, E_s, \sigma_{ys},$$
$$\sigma_{us}, \sigma_{fs}, L)L, (\rho_l, E_l, \sigma_{yl}, \sigma_{ul}, \sigma_{fl}L)\}$$

Where, $$\sigma_{fs} = \sqrt{\frac{\sigma_{ys}\sigma_{us}}{1+n}}$$

is a flow stress of the sth material in the candidate library, $\rho_s$ is a material density of the sth material in the candidate library, and $E_s$ is an elastic modulus of the sth material in the candidate library.

To solve the discrete optimal problems of body materials, we define a nominal flow stress, which is a positive non-physical parameter.

S4.2.2: The nominal flow stress for current cells is updated by equation (17):

$$\sigma'^{(h+1,k)}_{\Omega_{i,j}} = \begin{cases} \sigma^{min}_{\Omega_{i,j}}, & \sigma'^{(h,k)}_{\Omega_{i,j}} + \Delta\sigma'^{(h,k)}_{\Omega_{i,j}} < \sigma^{min}_{\Omega_{i,j}} \\ \sigma'^{(h,k)}_{\Omega_{i,j}} + \Delta\sigma'^{(h,k)}_{\Omega_{i,j}}, & \sigma^{min}_{\Omega_{i,j}} \leq \sigma'^{(h,k)}_{\Omega_{i,j}} + \Delta\sigma'^{(h,k)}_{\Omega_{i,j}} \leq \sigma^{max}_{\Omega_{i,j}} \\ \sigma^{max}_{\Omega_{i,j}}, & \sigma'^{(h,k)}_{\Omega_{i,j}} + \Delta\sigma'^{(h,k)}_{\Omega_{i,j}} > \sigma^{max}_{\Omega_{i,j}} \end{cases} \quad (17)$$

in which, $\sigma'^{(h,k)}_{\Omega_{i,j}}$ is a nominal flow stress of the jth cell in the hth inner loop and the kth outer loop, $\sigma'^{(h+1,k)}_{\Omega_{i,j}}$ is a nominal flow stress of the jth cell in the (h+1)th inner loop and the kth outer loop, $\sigma^{min}_{\Omega_{i,j}}$ and $\sigma^{max}_{\Omega_{i,j}}$ are respectively a minimize and a maximum value of the actual flow stress of the jth cell in the subdomain $\Omega_i$, $\Delta\sigma'^{(h,k)}_{\Omega_{i,j}}$ is a nominal flow stress variation of the jth cell in the subdomain $\Omega_i$ in the hth inner loop and the kth outer loop:

$$\Delta\sigma'^{(h,k)}_{\Omega_{i,j}} = (\sigma^{max}_{\Omega_{i,j}} - \sigma^{min}_{\Omega_{i,j}})f(e^{(h,k)}_{\Omega_{i,j}}) \quad (18)$$

where, $e^{(h,k)}_{\Omega_{i,j}}$ denotes a difference between the current IED $S^{(k)}_{\Omega_{i,j}}$ and the target IED $S^{*(h,k)}_{m'}$ as follows:

$$e^{(h,k)}_{\Omega_{i,j}} = \frac{S^{(k)}_{\Omega_{i,j}} - S^{*(h,k)}_{m'}}{S^{*(h,k)}_{m'}} \quad (19)$$

$f(e^{(h,k)}_{\Omega_{i,j}})$ is a PID control function for updating the nominal flow stress, which integrates the advantages of the proportional control, integral control and derivative control to improve the control performance:

$$f(e^{(h,k)}_{\Omega_{i,j}}) = K_p e^{(h,k)}_{\Omega_{i,j}} + K_i \left[e^{(h,k)}_{\Omega_{i,j}} + \sum_{\tau=1}^{k-1} e^{(\tau)}_{\Omega_{i,j}}\right] + K_d \left[e^{(h,k)}_{\Omega_{i,j}} - e^{(k-1)}_{\Omega_{i,j}}\right] \quad (20)$$

where, $K_p$ is a proportional control coefficient, $K_i$ is an integral control coefficient, $K_d$ is a differential control coefficient, $e^{(\tau)}_{\Omega_{i,j}}$ is a relative deviation item of the τth outer loop, $e^{(k-1)}_{\Omega_{i,j}}$ is a relative deviation item of the (k−1)th outer loop.

S4.2.3: The nominal flow stress is compared with the actual flow stress of each material in the candidate material library and the candidate material of which the actual flow stress is closest to the nominal flow stress is selected as the material of the current cell ("selected material" for short):

$$\begin{cases} \sigma'^{(h+1,k)}_{\Omega_{i,j}} - \sigma_{fp} = \min\left(\sigma'^{(h+1,k)}_{\Omega_{i,j}} - \sigma_{f1}, L, \sigma'^{(h+1,k)}_{\Omega_{i,j}} - \sigma_{fs}, L, \sigma'^{(h+1,k)}_{\Omega_{i,j}} - \sigma_{fl}\right) \\ \sigma^{(h+1,k)}_{\Omega_{i,j}} = \sigma_{fp} \\ Mat^{(h+1,k)}_{\Omega_{i,j}} = Mat(p) \end{cases} \quad (21)$$

in which, p denotes a position of the selected material in the candidate material library, $\sigma_{fp}$ is an actual flow stress of the selected material, $\sigma'^{(h+1,k)}_{\Omega_{i,j}}$ is an actual flow stress of the jth cell in the subdomain $\Omega_i$ in the (h+1)th inner loop and the kth outer loop, Mat(p) denotes a selected material, $Mat^{(h+1,k)}_{\Omega_{i,j}}$ denotes a selected material of the jth cell in the subdomain $\Omega_i$ in the (h+1)th inner loop and the kth outer loop.

S4.2.4: Cell material properties are replaced by the selected material properties Material properties of a cell are replaced by the selected material properties mentioned above by equation (22):

$$\begin{pmatrix} \rho^{(h+1,k)}_{\Omega_{i,j}} \\ E^{(h+1,k)}_{\Omega_{i,j}} \\ \sigma^{(h+1,k)}_{y,\Omega_{i,j}} \\ \sigma^{(h+1,k)}_{u,\Omega_{i,j}} \\ \sigma^{(h+1,k)}_{f,\Omega_{i,j}} \end{pmatrix} = \begin{pmatrix} \rho_p \\ E_p \\ \sigma_{yp} \\ \sigma_{up} \\ \sigma_{fp} \\ L \end{pmatrix} \quad (22)$$

where, $\rho^{(h+1,k)}_{\Omega_{i,j}}$ is a material density the jth cell in the subdomain $\Omega_i$ in the (h+1)th inner loop and the kth outer loop, $E^{(h+1,k)}_{\Omega_{i,j}}$ is an elastic modulus of the jth cell in the subdomain $\Omega_i$ in the (h+1)th inner loop and the kth outer loop, $\sigma'^{(h+1,k)}_{\Omega_{i,j}}$ is a yield stress of the jth cell in the subdomain $\Omega_1$ in the (h+1)th inner loop and the kth outer loop, $\sigma^{(h+1,k)}_{u,\Omega_{i,j}}$ is a tensile strength of the jth cell in the subdomain $\Omega_i$ in the (h+1)th inner loop and the kth outer loop, and $\sigma^{(h+1,k)}_{f,\Omega_{i,j}}$ is a flow stress of the jth cell in the subdomain $\Omega_i$ in the (h+1)th inner loop and the kth outer loop; $\rho_p$ is a material density of the selected material, $E_p$ is an elastic modulus of the selected material, $\sigma_{yp}$ is a yield stress of the selected material, $\sigma_{up}$ is a tensile strength of the selected material, and $\sigma_{fp}$ is a flow stress of the selected material.

According to the above steps, a cell cost $C^{(h+1,k)}_{\Omega_{i,j}}$ can be calculated as follows:

$$C^{(h+1,k)}_{\Omega_{i,j}} = \xi_{\Omega_{i,j}}^{(h+1,k)} \rho^{(h+1,k)}_{\Omega_{i,j}} t_{\Omega_{i,j}} A_{\Omega_{i,j}} \quad (23)$$

where, $C^{(h+1,k)}_{\Omega_{i,j}}$ is a cost of the selected material of the jth cell in the subdomain $\Omega_i$ in the (h+1)th inner loop and the kth outer loop, $\xi_{\Omega_{i,j}}^{(h+1,k)}$ is a price of the selected material of the jth cell in the subdomain $\Omega_i$ in the (h+1)th inner loop and the kth outer loop, and $\rho_{\Omega_{i,j}}^{(h+1,k)}$ is a density of the selected material of the jth cell in the subdomain $\Omega_i$ in the (h+1)th inner loop and the kth outer loop; $t_{\Omega_{i,j}}$ is a thickness of the jth cell in the subdomain $\Omega_i$ and $A_{\Omega_{i,j}}$ is an area of the jth cell in the subdomain $\Omega_i$.

S4.3: The process returns S4.1 if the convergence condition of the inner loop is not satisified or exists the inner loop and continue to S5.

The convergence condition of the inner loop is:

$$|C^{(h,k)} - C^{*(k)}| < \varepsilon_1 \text{ or } k_1 \geq k_{1max} \quad (24)$$

where $$C^{(h,k)} = \sum_{i=1}^{I} \sum_{j=1}^{N} C_{\Omega_{i,j}}^{(h,k)}$$

denotes a total cost in the kth outer loop and the hth inner loop, $C^{*(k)}$ is a target cost defined in the kth outer loop, $\varepsilon_1$ is a cost convergence factor, $k_1$ denotes the number of iterations in the inner loop, and $k_{1max}$ denotes a maximum number of iterations in the inner loop.

S5: The optimal results are written out if the global convergence conditions in the outer loop are satisfied or the M-SHCA algorithm returns to S3.

The M-SHCA algorithm will be terminated if one of the following three convergence conditions is satisfied:

(1) The number of iterations k (namely, the number of finite element simulation analyses) in the outer loop exceeds a user defined a maximum number of iterations $k_{max}$.

(2) $p_f > p^*_f$ and a current design point is a feasible solution, in which $p_f$ denotes the number of iterations where infeasible solutions continuously appear and $p^*_f$ denotes a maximum number of iterations where infeasible solutions continuously appear.

(3) The difference of design variables between two iterations is very small, namely:

$$\sum_{i=1}^{N} \left| \sigma_{\Omega_{i,j}}^{\prime k} - \sigma_{\Omega_{i,j}}^{\prime k-1} \right| < \varepsilon_2$$

in which, N is the total number of cells, and $\varepsilon_2$ represents a global convergence factor.

The material-based subdomain hybrid cellular automata method for solving the material optimization of thin-walled frame structures includes the modelling module and the loop module.

The modelling module is used to construct the initial collision finite element model and subdomain cellular automaton model for optimize the materials and costs of thin-walled frame structures and to define the material variables and the field variables.

The loop module is used to execute the outer and inner loops.

An electronic device including a processor and a memory, in which the memory is used to store computer-readable code; the processor is used to execute the computer-readable code and implement a subdomain hybrid cellular automata method for optimizing the material of a thin-walled framework structure when executing the computer-readable code.

Based on the same invention concept as the subdomain hybrid cellular automaton method for optimizing the thin-walled frame structural materials, the present invention also provides an electronic device comprising one or more processors and one or more memories, wherein the memory stores computer-readable code, the computer-readable code executing in one or more processors, The subdomain hybrid cellular automaton method is implemented to optimize materials in thin-walled frame structures, in which, the memory can include non-volatile storage media and memory storage. The non-volatile storage media can store the operating system and computer-readable code. The computer-readable code includes program instructions, which can enable the processor to execute any subdomain hybrid cellular automaton method for optimizing thin-walled framework structural materials. The processor is used to provide computing and control capabilities, supporting the operation of the entire electronic device. Memory provides an environment for the operation of computer-readable code in non-volatile storage media. When the computer readable code is executed by the processor, it can enable the processor to execute any sub domain hybrid cellular automaton method for optimizing thin-walled framework structural materials.

It should be understood that the processor can be a Central Processing Unit (CPU), which can also be other general-purpose processors, Digital Signal Processors (DSP), Application Specific Integrated Circuits (ASIC), Field Programmable Gate Arrays (FPGA), or other programmable logic devices Discrete gate or transistor logic devices, discrete hardware components, etc. Among them, general-purpose processors can be microprocessors or this processor can also be any conventional processor, etc.

In the present application, a computer-readable storage medium is also provided, wherein the computer-readable storage medium stores computer-readable code, the computer-readable code includes program instructions and the processor executes the program instructions to implement the sub region hybrid cellular automaton method for optimizing thin-walled structural materials of the present invention.

wherein, the computer-readable storage medium can be an internal storage unit of the electronic device described in the aforementioned embodiments, such as a hard disk or memory of the computer device. The computer-readable storage medium can also be an external storage device of the electronic device, such as a plug-in hard disk, Smart Media Card (SMC), Secure Digital (SD) card, Flash Card, etc. equipped on the electronic device.

Embodiment

Figure 5:
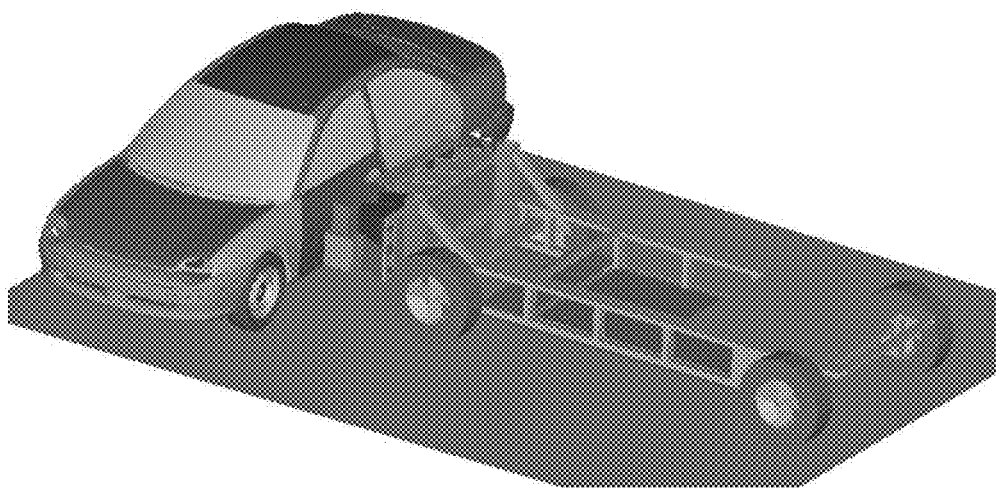
FIG. 5 is a schematic diagram of a full-vehicle side crash finite element model in the present invention.

To verify the convergence and efficiency of the M-SHCA algorithm, it is employed to optimize the material distribution and cost of a car body frame under side collisions. The total weight of the full-vehicle crash FE model is 1346 kg including 276838 elements and 284961 nodes, in which body in white (BIW) adopts the shell elements and engine, gearbox, suspension system, etc. adopt the solid elements. The piecewise elastoplastic materials are used for the deformable structures and the rigid materials are adopted for the undeformable structures. The automatic single surface, automatic surface to surface, automatic node to surface algorithms are defined for the possible contact positions during side collisions. According to the requirements of the regulation titled "The protection of the occupants in the event of a lateral collision" (GB 20071-2006), a mobile deformable barrier (MDB) with a weight of 950 kg should hit a target vehicle perpendicularly at an initial velocity of 50 km/h, as shown in FIG. 5.

Step 1: Definition of the Subdomain CA Model and Design Variable

During the vehicle side collisions, B-pillar, sill, doors, and roof middle crossbeam appear large deformation which are the main energy absorbing structures and A-pillar, roof rail, seat crossbeam, and roof crossbeam are the main structures to transfer impact loading. Therefore, the material of 34 parts of 14 assemblies, such as the A-pillar, B-pillar, sill, roof rail, front and rear doors, rear side member, seat crossbeam, and roof crossbeam are defined as the design variables.

Figure 6:
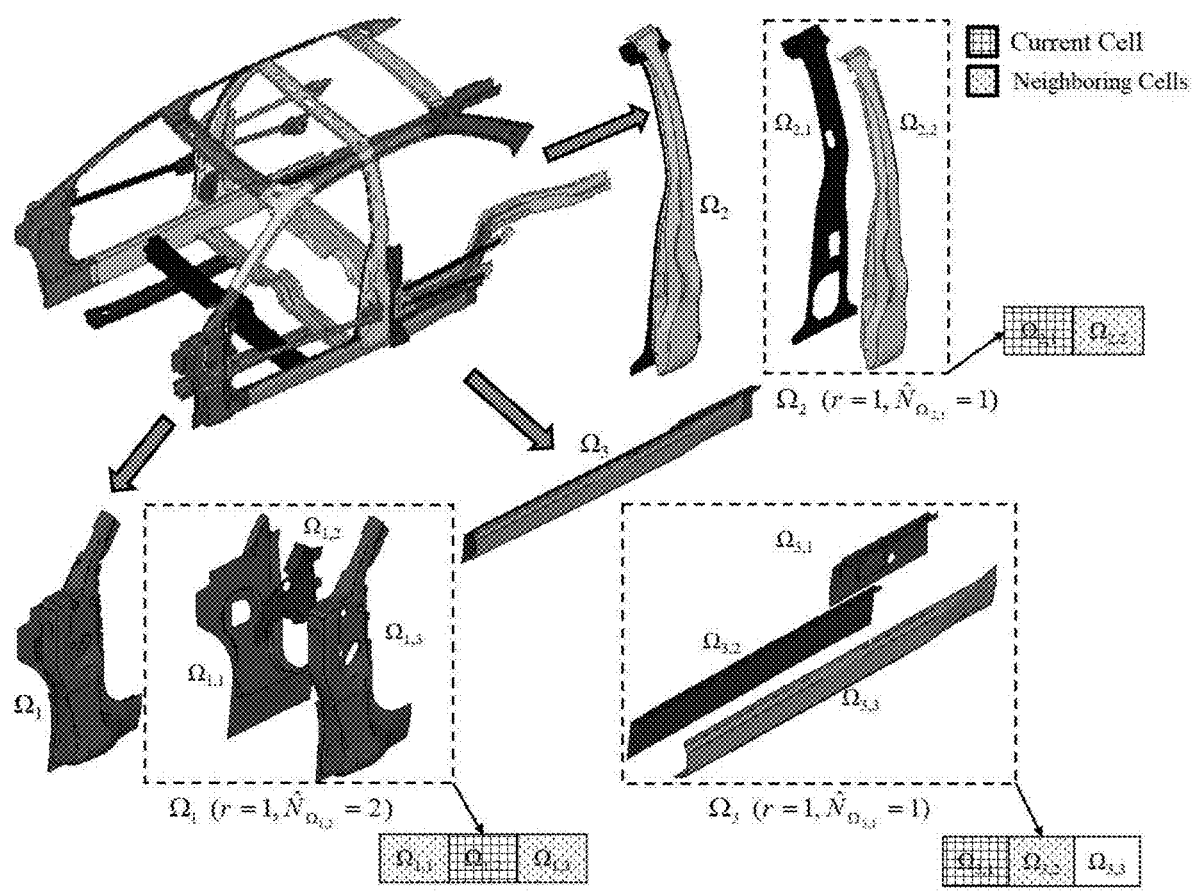
FIG. 6 is a schematic diagram of a SCA model of a car body beam frame in the present invention.

The detailed steps to define the subdomain CA model for the car body beam frame are provided as follows:

Step (1): Subdomain fragmentation: The design space is fragmented into several independent subdomains denoted as $\Omega_i$ based on the topological connection characteristics of the car body frame structure. For example, the assemblies such as A-pillar, B-pillar, and sill, are respectively defined as a subdomain $\Omega_1$, a subdomain $\Omega_2$, and a subdomain $\Omega_3$, as shown in FIG. 6.

Step (2): Cell definition: Each component is defined as a cell $\Omega_{i,j}$ in the subdomain $\Omega_i$ (i=1,2,L,I), where the subscript i of $\Omega_{i,j}$ denotes an index of the ith subdomain, and the subscript j denotes a location of current cell in the ith subdomain. The subscripts j of each cell $\Omega_{i,j}$ are sequentially numbered from small to large according to principles of from inside to outside, from front to back, and from bottom to top.

Step (3): Cell state variable definition: The design variables (e.g. material) and field variables (e.g. IEDs) are sequentially defined for each cell.

Step (4). cell neighborhood definition: All subdomains are traversed, for cells in the same subdomain, the neighboring cells of the current cell are determined according to orders of subscripts j, and a set of the neighboring cells of the current cell is referred to as the cell neighborhood. Three subdomains are defined in FIG. 6. All cells within the cell radius of r=1 from the center of the current cell are referred to as the neighboring cells of the current cell. The number of neighboring cells of a current cell $\Omega_{1,2}$ is 2, ($\hat{N}_{\Omega_{1,2}}=2$), the number of neighboring cells of a current cell $\Omega_{2,1}$ is 1 ($\hat{N}_{\Omega_{2,1}}=1$), and the number of neighboring cells of a current cell $\Omega_{3,1}$ is 1 ($\hat{N}_{\Omega_{3,1}}=1$).

Figure 7:
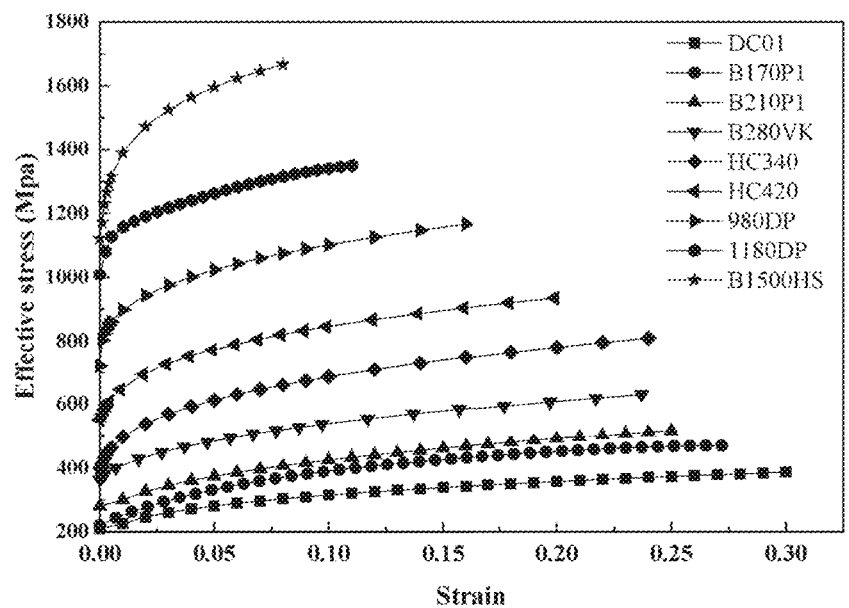
FIG. 7 is effective stress-strain curves of candidate materials in the present invention.

Following the above 4 steps, a total of 14 subdomains and a total of 34 thickness variables are defined for the car body beam frame model, as shown in TABLE 2. The material parameters of the candidate material library are listed in FIG. 7 and TABLE 3.

TABLE 2

The SCA model and the design variables of body beam frame

| SCA | | CA | | Design variables | |
|---|---|---|---|---|---|
| Name | Sy | Name | Symbol | Symbol | Initial |
| A-pillar | $\Omega_1$ | A-pillar inner panel | $\Omega_{1,1}$ | $Mat_1$ | HC340 |
| | | A-pillar reinforcement#1 | $\Omega_{1,2}$ | $Mat_2$ | B280VK |
| | | A-pillar reinforcement#2 | $\Omega_{1,3}$ | $Mat_3$ | HC340 |
| | | A-pillar outer panel | $\Omega_{1,4}$ | $Mat_4$ | HC420 |
| B-pillar | $\Omega_2$ | B-pillar inner panel | $\Omega_{2,1}$ | $Mat_5$ | DP980 |
| | | B-pillar reinforcement | $\Omega_{2,2}$ | $Mat_6$ | DP980 |
| Sill | $\Omega_3$ | Sill inner panel#1 | $\Omega_{3,1}$ | $Mat_7$ | HC420 |
| | | Sill inner panel#2 | $\Omega_{3,2}$ | $Mat_8$ | HC420 |
| | | Sill reinforcement | $\Omega_{3,3}$ | $Mat_9$ | HC420 |
| Roof rail | $\Omega_4$ | A-pillar roof rail#1 | $\Omega_{4,1}$ | $Mat_{10}$ | B210P1 |
| | | A-pillar roof rail#2 | $\Omega_{4,2}$ | $Mat_{11}$ | HC420 |
| | | B-pillar roof rail | $\Omega_{4,3}$ | $Mat_{12}$ | HC420 |
| | | C-pillar roof rail | $\Omega_{4,4}$ | $Mat_{13}$ | HC420 |
| Front door | $\Omega_5$ | Front door anti-collision | $\Omega_{5,1}$ | $Mat_{14}$ | HC340 |
| | | Front door anti-collision | $\Omega_{5,2}$ | $Mat_{15}$ | HC420 |
| | | Front door anti-collision | $\Omega_{5,3}$ | $Mat_{16}$ | HC340 |
| | | Front door inner panel | $\Omega_{5,4}$ | $Mat_{17}$ | HC420 |
| Rear door | $\Omega_6$ | Rear door anti-collision beam | $\Omega_{6,1}$ | $Mat_{18}$ | HC340 |
| | | Rear door anti-collision | $\Omega_{6,2}$ | $Mat_{19}$ | HC420 |
| | | Rear door anti-collision beam | $\Omega_{6,3}$ | $Mat_{20}$ | HC340 |
| | | Rear door inner panel | $\Omega_{6,4}$ | $Mat_{21}$ | HC420 |
| | | Rear door anti-collision beam | $\Omega_{6,5}$ | $Mat_{22}$ | HC340 |
| | | Rear door anti-collision | $\Omega_{6,6}$ | $Mat_{23}$ | HC420 |
| | | Rear door anti-collision beam mounting panel#4 | $\Omega_{6,7}$ | $Mat_{24}$ | HC340 |
| Rear side member | $\Omega_7$ | Rear side member inner panel | $\Omega_{7,1}$ | $Mat_{25}$ | HC420 |
| | | Rear side member outer | $\Omega_{7,2}$ | $Mat_{26}$ | HC420 |
| Seat crossbeam | $\Omega_8$ | Seat crossbeam lining panel | $\Omega_{8,1}$ | $Mat_{27}$ | HC420 |
| | | Seat crossbeam | $\Omega_{8,2}$ | $Mat_{28}$ | HC420 |
| Front side member | $\Omega_9$ | Front side member rear | $\Omega_{9,1}$ | $Mat_{29}$ | HC420 |
| Seat rear crossbeam | $\Omega_{10}$ | Seat rear crossbeam | $\Omega_{10,1}$ | $Mat_{30}$ | HC420 |
| Rear floor front | $\Omega_{11}$ | Rear floor front crossbeam | $\Omega_{11,1}$ | $Mat_{31}$ | HC420 |
| Roof front | $\Omega_{12}$ | Roof front crossbeam | $\Omega_{12,1}$ | $Mat_{32}$ | HC420 |
| Roof middle | $\Omega_{13}$ | Roof middle crossbeam | $\Omega_{13,1}$ | $Mat_{33}$ | DP980 |
| Roof rear crossbeam | $\Omega_{14}$ | Roof rear crossbeam | $\Omega_{14,1}$ | $Mat_{34}$ | HC420 |

TABLE 3

Material parameters for the candidate material library

| Material | Density (g/cm³) | Elastic modulus | Yield strength | Tensile strength | Hardening Index | Flow stress | Price (CNY/kg) |
|---|---|---|---|---|---|---|---|
| DC01 | 7.8 | 210 | 209 | 386 | 0.1 | 270.8 | 7 |
| B170P1 | 7.8 | 210 | 221 | 470 | 0.1 | 307.3 | 8 |
| B210P1 | 7.8 | 210 | 280 | 519 | 0.1 | 363.5 | 9 |
| B280VK | 7.8 | 210 | 363 | 632 | 0.1 | 456.7 | 10 |
| HC340 | 7.8 | 210 | 398 | 809 | 0.1 | 541.0 | 11 |
| HC420 | 7.8 | 210 | 550 | 935 | 0.1 | 683.7 | 12 |
| 980DP | 7.8 | 210 | 720 | 1167 | 0.1 | 874.0 | 13 |
| 1180DP | 7.8 | 210 | 1009 | 1167 | 0.1 | 1112.8 | 14 |
| B1500HS | 7.8 | 210 | 1122 | 1667 | 0.1 | 1304.0 | 15 |

Step 2: Definition of Output Response

Figure 8:
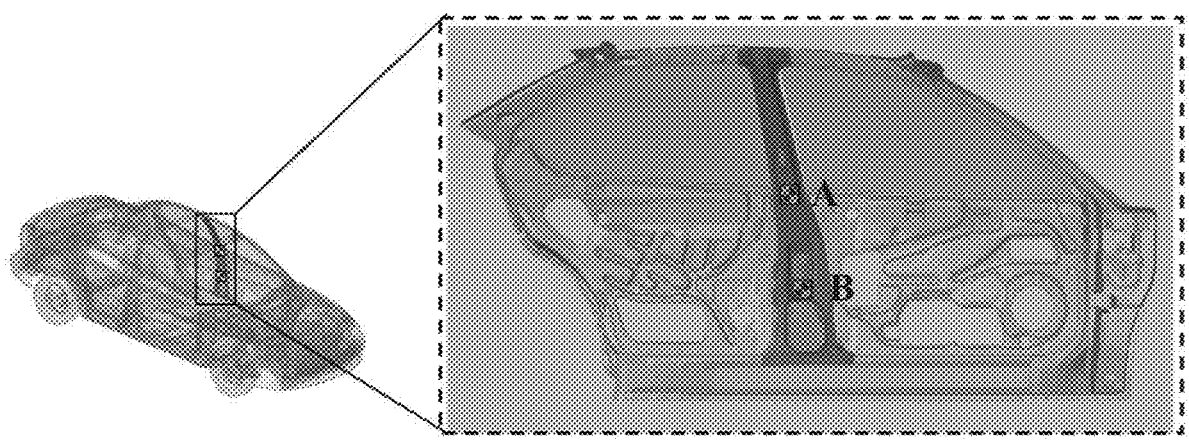
FIG. 8 is measuring points at B-pillar, in which points A and B are respectively locations related to the loading positions to passenger's chest and pelvis.

In the side collisions simulation of the car body frame, B-pillar is a key component that resists excessive deformation of the body structure and reduces the speed of body intrusion. Excessive deformation of B-pillar will lead the body structure to invade a passenger compartment significantly while reducing the living space of the passenger compartment and causing crash injuries to the passenger. The soft tissue organs such as heart and lungs of passenger are very sensitive to speed changing of the chest position. If the intrusion velocity is too high, the vital organs in chest will be damaged seriously. Therefore, the maximum intrusion amounts and maximum intrusion velocities of B-pillar corresponding to the chest and pelvic positions are respectively selected as the crashworthiness indexes and output responses under side collisions, which are denoted as $d_1(Mat)$, $v_1(Mat)$, $d_2(Mat)$ and $v_2(Mat)$, respectively. As depicted in FIG. 8, a measuring point of B-pillar corresponding to chest is the point A on the inner panel of B-pillar parallel to passenger's chest and a measuring point of B-pillar corresponding to pelvis is the point B on the inner panel of B-pillar parallel to passenger's pelvis.

Step 3: Definition of Optimization Formulation

In this embodiment, the total cost of 34 parts in TABLE 2 is used as the objective function in which the initial cost is CNY 1291. The maximum invasion amounts and maximum intrusion speeds corresponding to the measuring points at B-pillar (points A and B) are defined as the constraint functions, in which the maximum intrusions at points A and B are 204.70 mm of 270.30 mm, respectively; the maximum initial intrusion velocities at points A and B are 7.78 m/s and 7.85 m/s, respectively. To make the initial full vehicle model meet the requirements of GB 20071-2006, the maximum intrusion amount and the maximum intrusion velocity should be less than or equal to 180 mm and 7.50 m/s, respectively. The initial values and design goals of the output response of B-pillar corresponding to the chest and pelvic positions are shown in TABLE 4, and the corresponding optimization equation is given as follows:

$$\begin{cases} \min \; Cos\, t(Mat) = \sum_{i=1}^{34} \xi_i \rho_i t_i A_i \\ \text{s.t.} \;\; d_1(Mat) \leq 180 \\ \phantom{\text{s.t.}} \;\; d_2(Mat) \leq 180 \\ \phantom{\text{s.t.}} \;\; v_1(Mat) \leq 7.5 \\ \phantom{\text{s.t.}} \;\; v_2(Mat) \leq 7.5 \\ \phantom{\text{s.t.}} \;\; Mat_i \in \begin{pmatrix} DC01, B170P1, B210P1, B280VK, HC340, \\ HC420, 980DP, 1180DP, B1500HS \end{pmatrix} \\ \phantom{\text{s.t.}} \;\; Mat = (Mat_1, \ldots, Mat_i, \ldots, Mat_{34}) \end{cases} \quad (25)$$

in which, $\xi_i$ is price of the ith cell material, $\rho_i$ is material density of the ith cell material, $t_i$ is thickness of the ith cell, $A_i$ is area of the ith cell, $Mat_i$ is material number of the ith cell, and DC01, B170P1, B210P1, B280VK, HC340, HC420, 980DP, 1180DP, B1500HS are candidate materials in the material library.

TABLE 4

Output responses and design target

| Responses | Symbol | Baseline design | Design target |
|---|---|---|---|
| Total cost of the 34 parts (CNY) | Cost(Mat) | 1291 | minimize |
| B-pillar maximum intrusion amount at chest location (mm) | $d_1$(Mat) | 207.30 | ≤180 |
| B-pillar maximum intrusion amount at pelvis location (mm) | $d_2$(Mat) | 204.70 | ≤180 |
| B-pillar maximum intrusion velocity at chest location (m/s) | $v_1$(Mat) | 7.78 | ≤7.5 |
| B-pillar maximum intrusion velocity at pelvis location (m/s) | $v_2$(Mat) | 7.85 | ≤7.5 |

Step 4: Optimization Results and Discussion

The horizontal IED target (HIED*) function is commonly calculated by the conventional HCA method in each iteration of the inner loop to make the current cost of the inner loop converged to the target mass by updating material with the PID control strategy.

In this embodiment, the M-SHCA algorithm adopting the HIED* function for cell material updating in the inner loop is referred to as "M-SHCA #1" and the M-SHCA algorithm adopting the SIED* function for cell material updating in the inner loop is referred to as "M-SHCA #2". To validate the convergence and efficiency of T-SHCA #2, the optimization equation in Equation (25) is separately solved by T-SHCA #1, T-SHCA #2 and parallel EGO-PCEI. The optimization results and the FEAs' numbers of the three algorithms are compared. The detail parameters used by T-SHCA #1, T-SHCA #2 are listed in TABLE 5, while those of parallel EGO-PCEI are listed in TABLE 6.

TABLE 5

Parameters configuration for M-SHCA#1 and M-SHCA#2

| Parameter name | Symbol | M-SHCA#1 | M-SHCA#2 |
|---|---|---|---|
| Total number of cells | N | 34 | 34 |
| Number of subdomains | l | 14 | 14 |
| Cell radius | r | 1 | 1 |
| Width threshold of "step interval" | $H_{threshold}$ | — | 4 |
| IED target threshold coefficient of "step interval" | $V_{threshold}$ | — | 1.1 |
| Proportional control coefficient of cell material variation | $K_p$ | 0.03 | 0.03 |
| Integral control coefficient of cell material variation | $K_i$ | 0.0001 | 0.0001 |
| Differential control coefficient of cell material variation | $K_d$ | 0.0001 | 0.0001 |
| Scale factor of the penalty value of the target cost | $K_q$ | 0.15 | 0.15 |
| Maximum penalty of target cost (CNY) | $\Delta C$ | 35 | 35 |
| Maximum iteration number for the consecutive infeasible solutions | $p^*_f$ | 10 | 10 |
| Maximum number of iterations in inner loop | $k_{1max}$ | 2000 | 2000 |
| Maximum number of iterations in outer loop | $k_{max}$ | 50 | 50 |
| Inner loop convergence factor | $\varepsilon_1$ | 0.001 | 0.001 |
| Outer loop convergence factor | $\varepsilon_2$ | 0.001 | 0.001 |

TABLE 6

Parameters configuration for parallel EGO-PCEI

| Parameter name | Symbol | Parameter value |
|---|---|---|
| Number of design variables | $N_v$ | 34 |
| Number of initial samples | $N_{initial}$ | 4 |
| Number of parallel calculations | $N_{parallel}$ | 4 |
| Maximum number of FEAs | $Max_{FEA}$ | 300 |

Figure 9A:
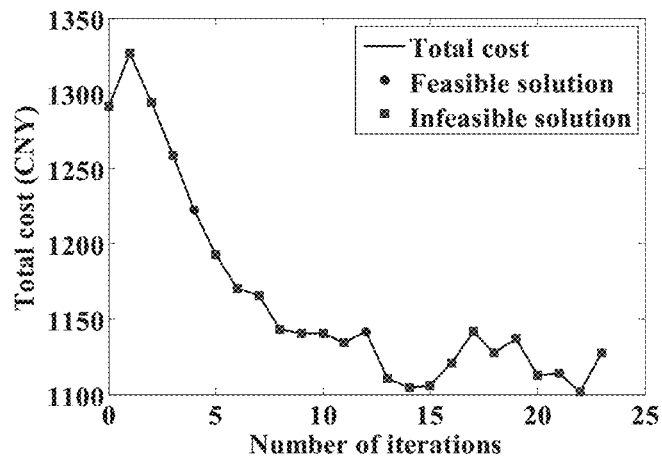
FIG. 9A is a diagram illustrating total cost convergence curve of M-HCA #1 algorithm in the present invention.
Figure 9B:
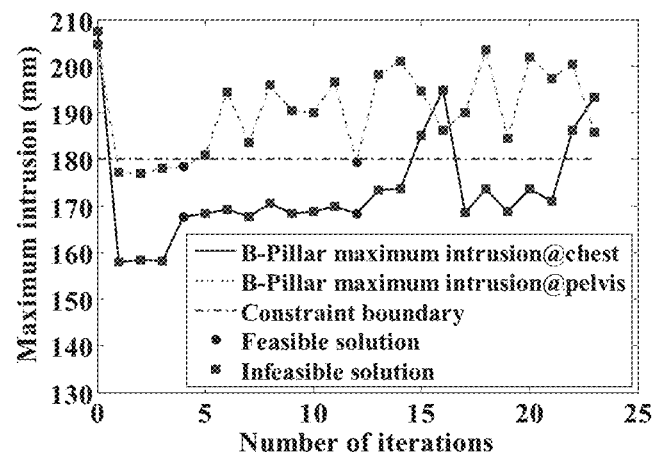
FIG. 9B is a diagram of an iteration process with a maximum intrusion amount of M-HCA #1 algorithm in the present invention.
Figure 9C:
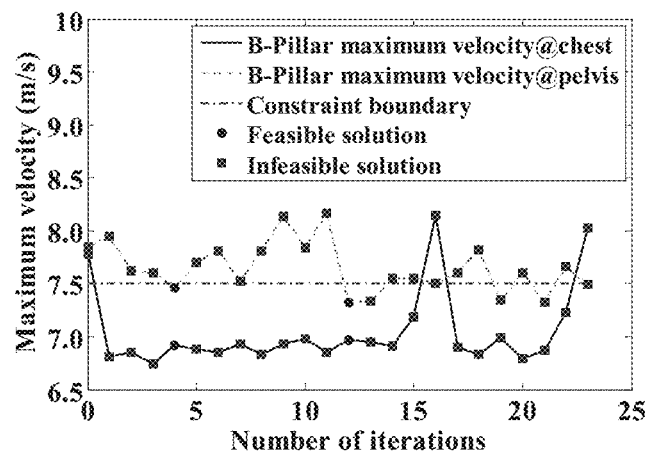
FIG. 9C is a diagram of an iteration process with a maximum intrusion velocity of M-HCA #1 algorithm in the present invention.
Figure 10A:
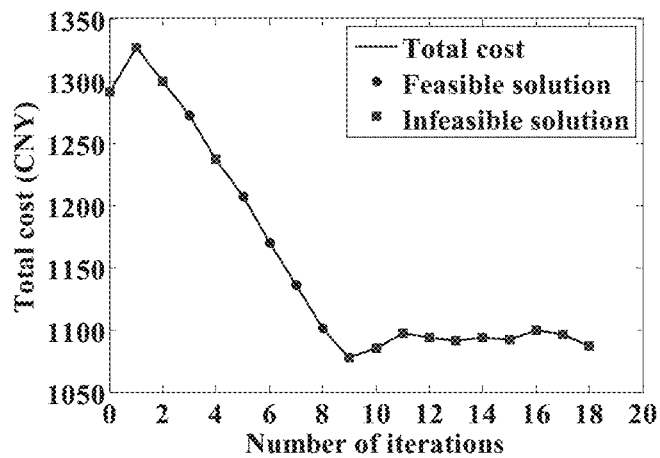
FIG. 10A is a diagram illustrating total cost convergence curve of M-HCA #2 algorithm in the present invention.
Figure 10B:
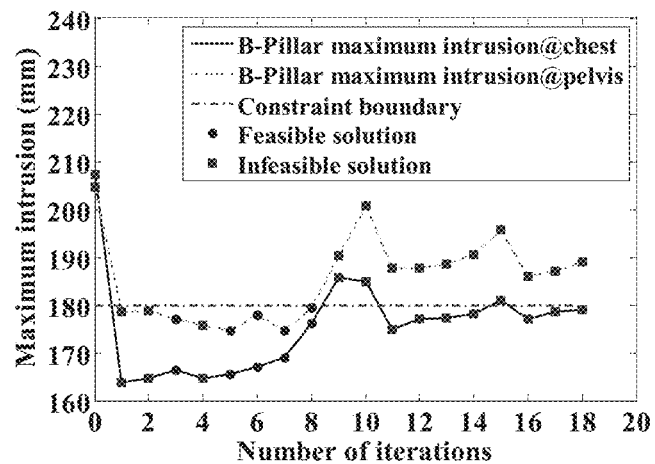
FIG. 10B is a diagram of an iteration process with a maximum intrusion amount of M-HCA #2 algorithm in the present invention.
Figure 10C:
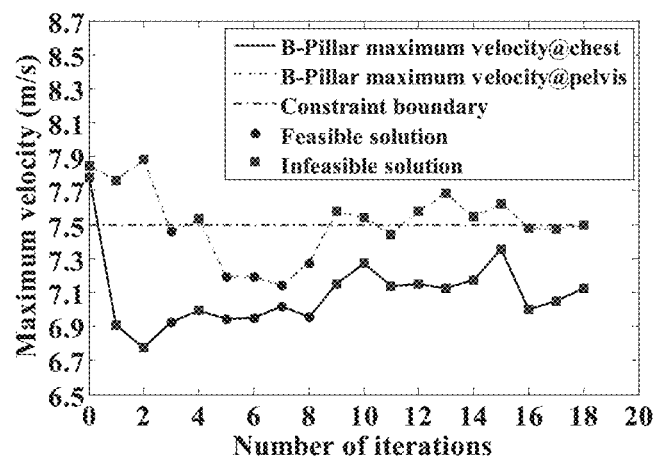
FIG. 10C is a diagram of an iteration process with a maximum intrusion velocity of M-HCA #2 algorithm in the present invention.
Figure 11A:
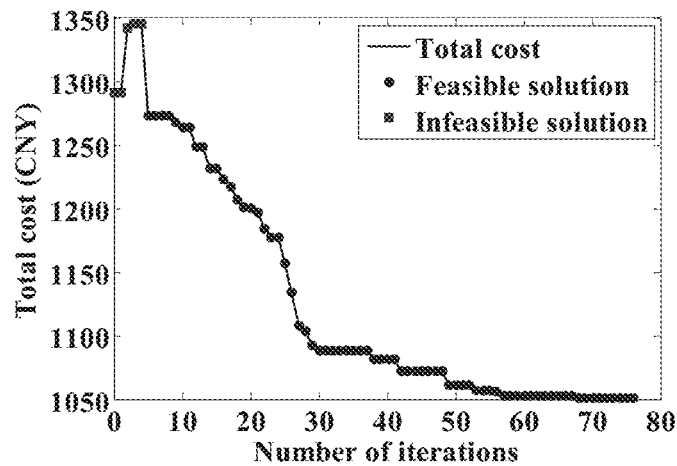
FIG. 11A is a diagram illustrating total cost convergence curve of a parallel EGO-PCEI algorithm in the present invention.
Figure 11B:
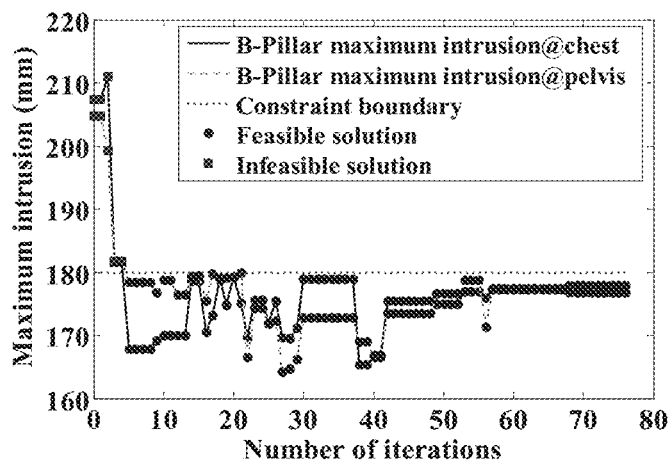
FIG. 11B is a diagram of an iteration process with a maximum intrusion amount of a parallel EGO-PCEI algorithm in the present invention.
Figure 11C:
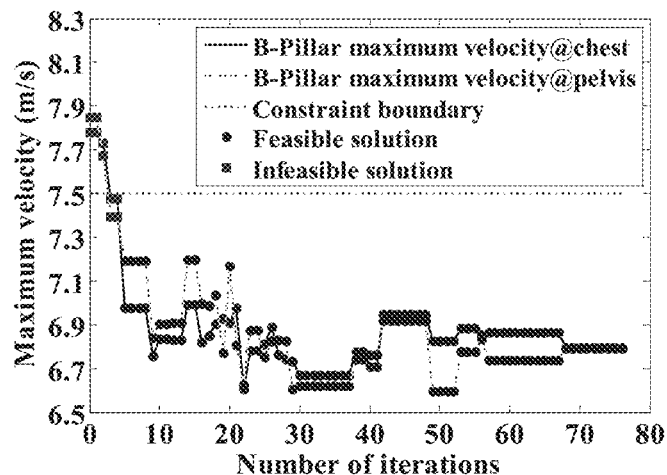
FIG. 11C is a diagram of an iteration process with a maximum intrusion velocity of a parallel EGO-PCEI algorithm in the present invention.
Figure 12:
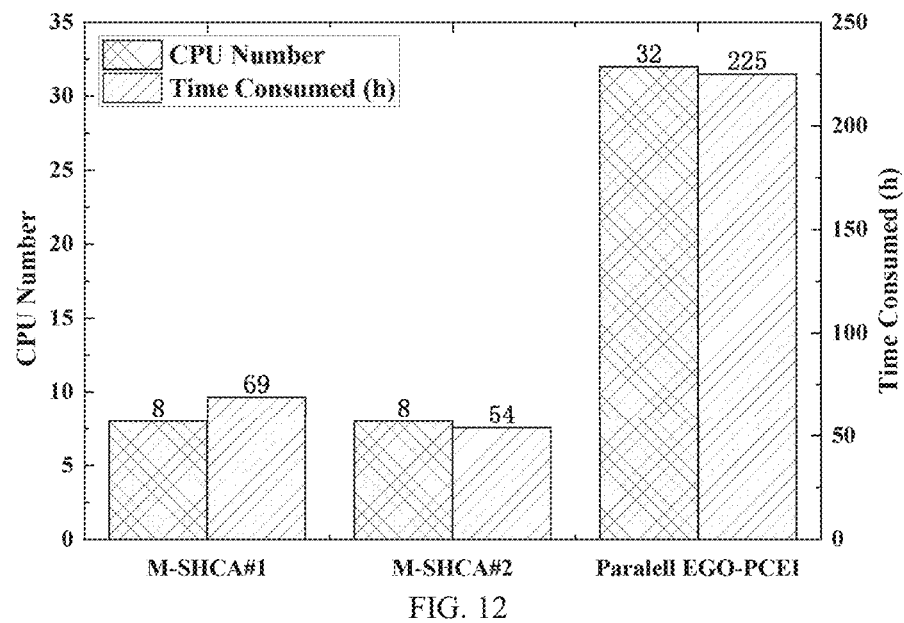
FIG. 12 is a schematic diagram of comparing the computational resources and computational time of M-HCA #1, M-HCA #2 and parallel EGO-PCEI algorithms.
Figure 13A:
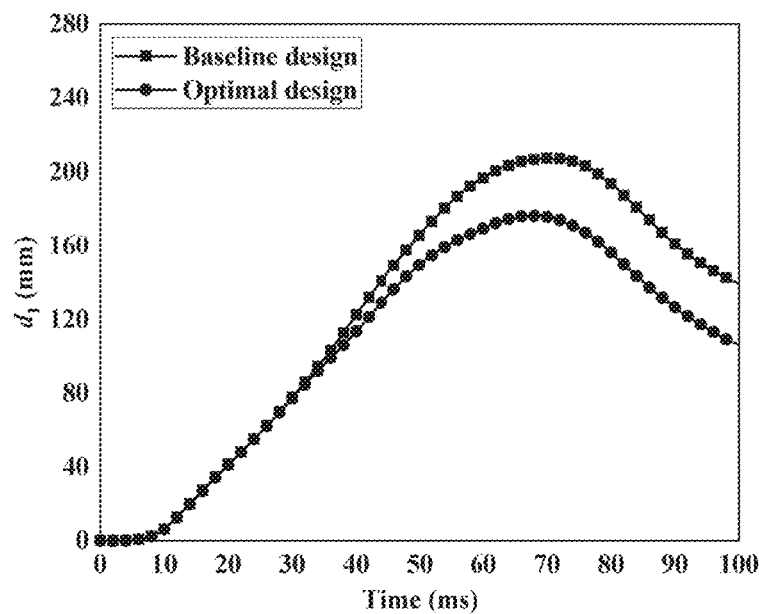
FIG. 13A is a comparison diagram of B-pillar intrusion amount curves at chest location in the present invention.
Figure 13B:
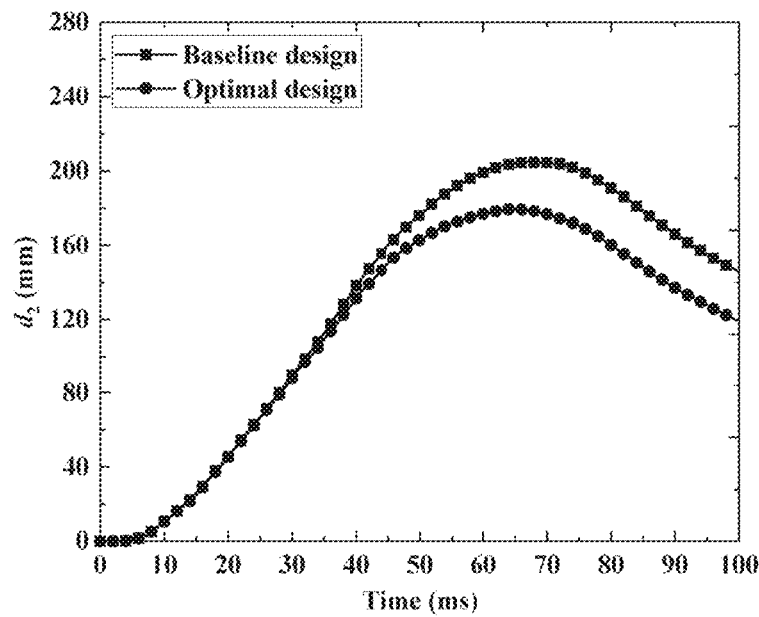
FIG. 13B is a comparison diagram of B-pillar intrusion amount at pelvis location in the present invention.
Figure 13C:
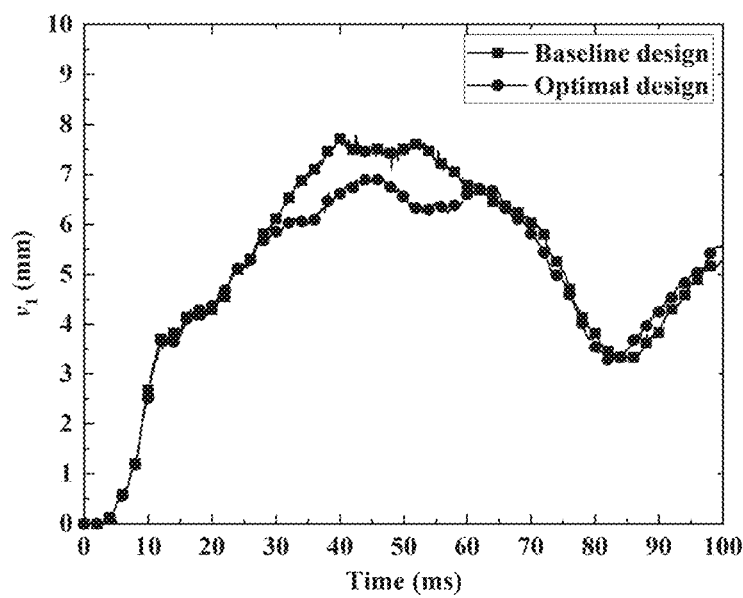
FIG. 13C is a comparison diagram of B-pillar intrusion velocity at chest location in the present invention.
Figure 13D:
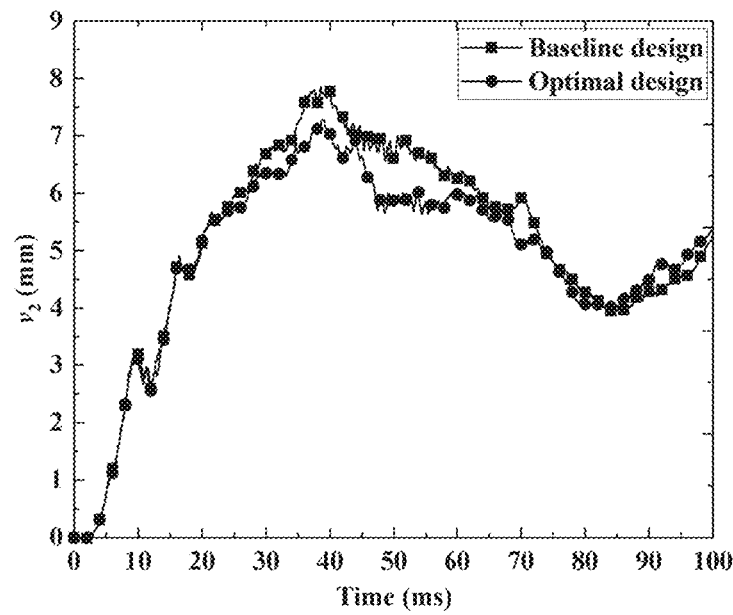
FIG. 13D is a comparison diagram of B-pillar intrusion velocity at pelvis location in the present invention.

The iteration processes of M-SHCA #1 are illustrated in FIG. 9, in which M-SHCA #1 converges after 23 iterations, an optimal solution is found in the 12th iteration, and a total of 23 FEAs are conducted. The iteration processes of M-SHCA #2 are illustrated in FIG. 10, in which M-SHCA #2 converges after 18 iterations, an optimal solution is found in the 8th iteration, and a total of 18 FEAs are conducted. With the comparisons between FIG. 9 and FIG. 10, M-SHCA #1 cannot find the global optimal solution, and it is very hard to decrease the total cost of body frame; M-SHCA #2 converges when its objective function quickly drops to CNY1101. The iteration processes of parallel EGO-PCEI are illustrated in FIG. 11, in which the global optimal solution is found after 67 iterations and a total of 300 FEAs are conducted before converging. Table 7 lists the initial designs, the responses of the optimal solutions and the total number of FEAs when the responses of T-SHCA #1, T-SHCA #2, and parallel EGO-PCEI converge to the optimal solutions. The computational resources and computational time spent by the three methods are compared in FIG. 12.

TABLE 7

Comparison between the initial design and the optimal solutions

| | Initial design | M-SHCA#1 | M-SHCA#2 | Parallel EGO-PCEI |
|---|---|---|---|---|
| Cost(Mat) (CNY) | 1291 | 1142 | 1101 | 1051 |
| $d_1$(Mat) (mm) | 207.30 | 168.3 | 176.20 | 177.20 |
| $d_2$(Mat) (mm) | 204.70 | 179.4 | 180.00 | 177.50 |
| $v_1$(Mat) (m/s) | 7.78 | 6.97 | 6.96 | 6.87 |
| $v_2$(Mat) (m/s) | 7.85 | 7.33 | 7.28 | 6.74 |
| Number of FEAs when converging to optimal solution | — | 12 | 8 | 271 |
| Total number of FEAs | 1 | 23 | 18 | 300 |
| Number of CPUs | 8 | 8 | 8 | 32 |
| Total time consumed (h) | 3 | 69 | 54 | 225 |

With the comparison and analysis of FIGS. 9-12 and TABLE 7, (1) M-SHCA #1 and M-SHCA #2 not only spend less computing resources, but also have higher optimization efficiency; (2) M-SHCA #1 is very easy to trap into a local optimal solution, but very hard to decrease the total cost of body frame; (3) M-SHCA #2 not only has a high optimization efficiency, but also a stronger capability for global searching and cost decreasing. (4) the global optimization precision of M-SHCA #2 is very close to that of parallel EGO-PCEI, but the optimization efficiency of M-SHCA #2 is obviously higher than that of parallel EGO-PCEI. In summary, M-SHCA #2 has higher global searching efficiency and numerical precision for solving the time-consuming nonlinear dynamic response optimization problems with multiple discrete variables and its effectiveness has been validated by engineering case.

The optimization effect of the M-SHCA algorithm based on the SIED* function (i.e. M-SHCA #2) is further discussed here. The total cost of 34 parts and the performance improvement percentage under side collisions before and after optimization as listed in Table 8, in which the optimal solution obtained by the M-SHCA algorithm has achieved a cost reduction effect of 14.72%, while $d_1$(Mat), $d_2$(Mat), $v_1$(Mat) and $v_2$(Mat) have reduced by 15.00%, 12.07%, 10.54%, and 7.26%, respectively. The proposed algorithm not only reduces the total cost of body frame to a large extent, but also significantly improves the safety of vehicle under side collisions.

TABLE 8

Performance improvement percentages before and after optimization

| | Cost (Mat) (CNY) | $d_1$ (Mat) (mm) | $d_2$ (Mat) (mm) | $v_1$ (Mat) (m/s) | $v_2$ (Mat) (m/s) |
|---|---|---|---|---|---|
| Initial design | 1291 | 207.30 | 204.70 | 7.78 | 7.85 |
| Optimal solution | 1101 | 176.20 | 180.00 | 6.96 | 7.28 |
| Relative change rate (%) | −14.72% | −15.00% | −12.07% | −10.54% | −7.26% |

The material distributions of the optimization solution and the initial body frame are compared in TABLE 9, in which the material of the optimal solution have been distributed more reasonably compared with the initial design; with the optimal material distribution for body frame, the side collision safety performance of body frame can be improved while the total cost of body frame can be greatly reduced. In other words, the multi-material body frame has a stronger potential to improve its crash safety and reduce its total cost than initial body frame with a small amount of materials.

TABLE 9

Material distribution of body frame before and after optimization

| Name | Symbol | Initial material | Optimal material |
|---|---|---|---|
| A-pillar inner panel | $Mat_1$ | HC340 | DC01 |
| A-pillar reinforcement#1 | $Mat_2$ | B280VK | DC01 |
| A-pillar reinforcement#2 | $Mat_3$ | HC340 | DC01 |
| A-pillar outer panel | $Mat_4$ | HC420 | DC01 |
| B-pillar inner panel | $Mat_5$ | DP980 | B1500HS |
| B-pillar reinforcement | $Mat_6$ | DP980 | B1500HS |
| Sill inner panel#1 | $Mat_7$ | HC420 | 1180DP |
| Sill inner panel#2 | $Mat_8$ | HC420 | B1500HS |
| Sill reinforcement | $Mat_9$ | HC420 | HC420 |
| A-pillar roof rail#1 | $Mat_{10}$ | B210P1 | DC01 |
| A-pillar roof rail#2 | $Mat_{11}$ | HC420 | DC01 |
| B-pillar roof rail | $Mat_{12}$ | HC420 | DC01 |
| C-pillar roof rail | $Mat_{13}$ | HC420 | DC01 |
| Front door anti-collision beam mounting panel#1 | $Mat_{14}$ | HC340 | B1500HS |
| Front door anti-collision beam | $Mat_{15}$ | HC420 | B1500HS |
| Front door anti-collision beam mounting panel#2 | $Mat_{16}$ | HC340 | B1500HS |
| Front door inner panel reinforcement | $Mat_{17}$ | HC420 | DC01 |
| Rear door anti-collision beam mounting panel#1 | $Mat_{18}$ | HC340 | DC01 |
| Rear door anti-collision beam#1 | $Mat_{19}$ | HC420 | DC01 |
| Rear door anti-collision beam mounting panel#2 | $Mat_{20}$ | HC340 | DC01 |
| Rear door inner panel reinforcement | $Mat_{21}$ | HC420 | DC01 |
| Rear door anti-collision beam mounting panel#3 | $Mat_{22}$ | HC340 | DC01 |
| Rear door anti-collision beam#2 | $Mat_{23}$ | HC420 | DC01 |
| Rear door anti-collision beam mounting panel#4 | $Mat_{24}$ | HC340 | DC01 |
| Rear side member inner panel | $Mat_{25}$ | HC420 | B280VK |
| Rear side member outer panel | $Mat_{26}$ | HC420 | B280VK |
| Seat crossbeam lining panel | $Mat_{27}$ | HC420 | B1500HS |
| Seat crossbeam | $Mat_{28}$ | HC420 | B1500HS |
| Front side member rear section | $Mat_{29}$ | HC420 | DC01 |
| Seat rear crossbeam | $Mat_{30}$ | HC420 | B210P1 |
| Rear floor front crossbeam | $Mat_{31}$ | HC420 | B170P1 |
| Roof front crossbeam | $Mat_{32}$ | HC420 | B170P1 |
| Roof middle crossbeam | $Mat_{33}$ | DP980 | B1500HS |
| Roof rear crossbeam | $Mat_{34}$ | HC420 | DC01 |

Figure 14A:
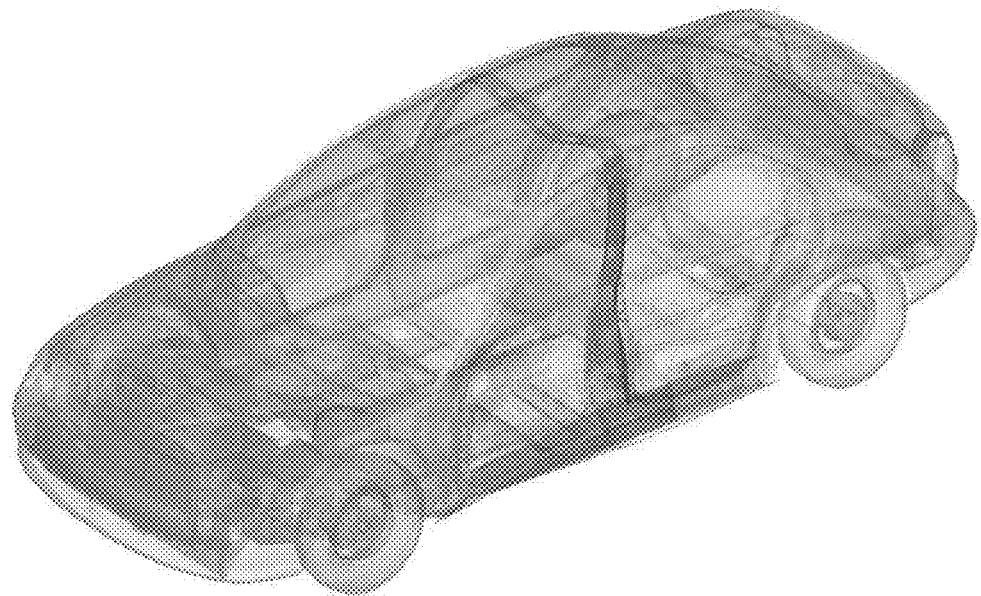
FIG. 14A is a diagram of a car body deformation pattern before optimization in the present invention.
Figure 14B:
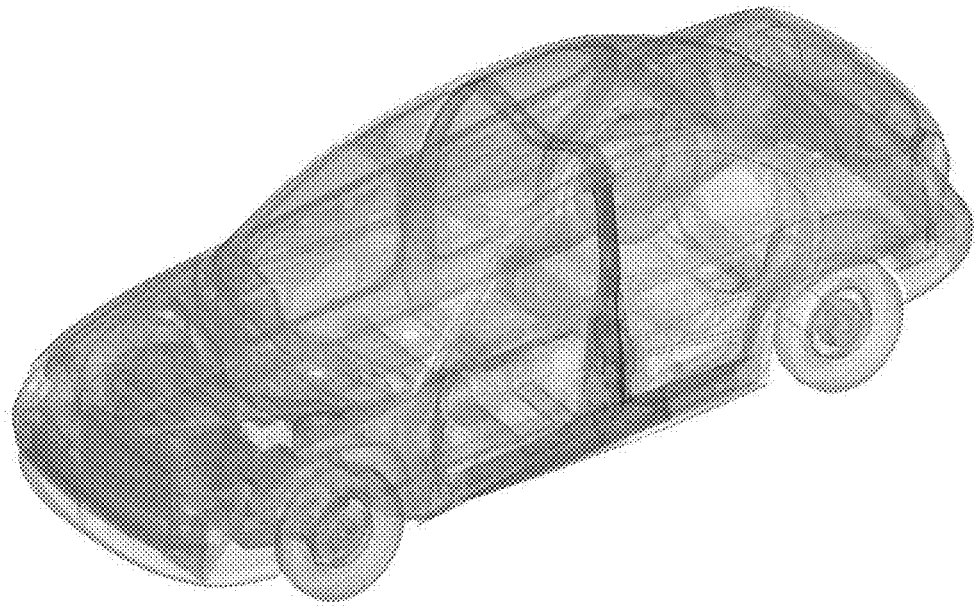
FIG. 14B is a diagram of a car body deformation pattern after optimization in the present invention.

From FIGS. 13-14, it is concluded that (1) the intrusion amounts and the intrusion velocity of the optimal solution are greatly improved compared with the initial design; (2) B-pillar and roof middle crossbeam have been strengthened in the optimal solution, of which the deformation modes have been significantly improved compared with the initial design.

From the discussion mentioned above, it is concluded that the M-SHCA algorithm based on the SIED* function have a higher efficiency of global searching than that based on the HIED* function for solving the large scale nonlinear dynamic responses structural optimization problems with many discrete design variables. So, the M-SHCA algorithm based on the SIED* function can be employed to effectively solve the optimization problems including the intrusion amounts and the intrusion velocity constraints, especially the nonlinear dynamic structural optimization problems with large scale discrete design variables.

The described embodiment is a preferred embodiment of the present invention, but the present invention is not limited to the aforementioned embodiment. Any obvious improvements, substitutions or modifications that can be made by those skilled in the art without departing from the essential content of the present invention shall fall within the protection scope of the present invention.

What is claimed is:

1. A material-based subdomain hybrid cellular automata method for solving material optimization of thin-walled frame structures, comprising the following steps:
   S1: establishing, by a processor, an initial crash finite element model, constructing a subdomain cellular automata model, defining material variables and field variables of the thin-walled frame structures, and employing the initial crash finite element model for material and cost optimization;
   S2: executing, by the processor, an outer loop: calculating a cell internal energy density and a constraint value at a current design point by finite element analysis and updating a target cost by a penalty function method according to an extent of the current design point violating a constraint boundary;
   S3: executing, by the processor, an inner loop with the following steps:
      S3.1: constructing a step internal energy density (IED) target (SIED*) function and updating a target IED;
      S3.2: updating a cell material by a material updating rule based on a proportional integral derivative (PID) control strategy;
      specifically: defining a candidate material library and a nominal flow stress of each material, updating a nominal flow stress of a current cell, comparing the nominal flow stress with a true flow stress of each material in the candidate material library, and selecting a candidate material closest to the nominal flow stress as a selected material of the current cell, replacing material parameters of the current cell with mechanical parameters of the selected material;
      S3.3: executing S4 and exiting an inner loop if the inner loop is convergent, otherwise returning to S3.1;
   S4: outputting, by the processor, optimal results if global convergence conditions in the outer loop are satisfied, otherwise returning to S2 for updating the cell material in the inner loop; and
   S5: selecting materials in the optimal results and assembling the thin-walled frame structures with the selected materials;
   wherein the thin-walled frame structures are selected from the group consisting of A-pillar B-pillar, sill, roof-rail, front door, rear door, rear side member, seat crossbeam, front side member rear section, seat rear crossbeam, rear floor front crossbeam, roof front crossbeam, roof middle crossbeam, and roof rear crossbeam.

2. The material-based subdomain hybrid cellular automata method for solving the material optimization of the thin-walled frame structures according to claim 1, wherein the candidate material library is defined as follows:

$$Mat = \{Mat(1), ..., Mat(s), ..., Mat(l)\}, 1 \le s \le l$$

$$= \{(\rho_1, E_1, \sigma_{y1}, \sigma_{u1}, \sigma_{f1}, ...), ..., (\rho_s, E_s, \sigma_{ys}, \sigma_{us}, \sigma_{fs}, ...)$$

$$..., (\rho_l, E_l, \sigma_{yl}, \sigma_{ul}, \sigma_{fl}, ...)\}$$

wherein, $\rho_s$ is a density of a sth material in the candidate material library; $E_s$ is an elastic modulus of the sth material in the candidate material library; $\sigma_{ys}$ is a yield strength of the sth material in the candidate material library;

$$\sigma_{fs} = \sqrt{\frac{\sigma_{ys}\sigma_{us}}{1+n}}$$

is a flow stress of the sth material in the candidate material library; $\sigma_{us}$ is a tensile strength of the sth material in the candidate material library; $l \ge 2$ is a number of materials in the candidate library.

3. The material-based subdomain hybrid cellular automata method for solving the material optimization of the thin-walled frame structures according to claim 1, wherein the nominal flow stress is a non-physical parameter, and the non-physical parameter is a positive real number.

4. The material-based subdomain hybrid cellular automata method for solving the material optimization of the thin-walled frame structures according to claim 1, wherein the nominal flow stress of each cell is updated by a following equation:

$$\sigma'^{(h+1,k)}_{\Omega_{i,j}} = \begin{cases} \sigma^{min}_{\Omega_{i,j}}, & \sigma'^{(h,k)}_{\Omega_{i,j}} + \Delta\sigma'^{(h,k)}_{\Omega_{i,j}} < \sigma^{min}_{\Omega_{i,j}} \\ \sigma'^{(h,k)}_{\Omega_{i,j}} + \Delta\sigma'^{(h,k)}_{\Omega_{i,j}}, & \sigma^{min}_{\Omega_{i,j}} \le \sigma'^{(h,k)}_{\Omega_{i,j}} + \Delta\sigma'^{(h,k)}_{\Omega_{i,j}} \le \sigma^{max}_{\Omega_{i,j}} \\ \sigma^{max}_{\Omega_{i,j}}, & \sigma'^{(h,k)}_{\Omega_{i,j}} + \Delta\sigma'^{(h,k)}_{\Omega_{i,j}} > \sigma^{max}_{\Omega_{i,j}} \end{cases}$$

wherein, $\sigma'^{(h,k)}_{\Omega_{i,j}}$ is a nominal flow stress of a jth cell in a subdomain $\Omega_i$ in a hth inner loop and a kth outer loop; $\sigma'^{(h+1,k)}_{\Omega_{i,j}}$ is a nominal flow stress of the jth cell in the subdomain $\Omega_i$ in a (h+1)th inner loop and the kth outer loop; $\sigma^{min}_{\Omega_{i,j}}$ and $\sigma^{max}_{\Omega_{i,j}}$ are a minimize value and a maximum value of an actual flow stress of the jth cell in the subdomain $\Omega_i$, respectively; $\Delta\sigma'^{(h,k)}_{\Omega_{i,j}}$ is a nominal flow stress variation of the jth cell in the subdomain $\Omega_i$ in the hth inner loop and the kth outer loop:

$$\Delta\sigma'^{(h,k)}_{\Omega_{i,j}} = (\sigma^{max}_{\Omega_{i,j}} - \sigma^{min}_{\Omega_{i,j}})f(e^{(h,k)}_{\Omega_{i,j}})$$

wherein, $e^{(h,k)}_{\Omega_{i,j}}$ denotes a difference between a current IED $S^{(k)}_{\Omega_{i,j}}$ and a target IED $S*^{(h,k)}_m$ and a PID control function for updating the nominal flow stress $f(e^{(h,k)}_{\Omega_{i,j}})$ is given as follows:

$$f\left(e^{(h,k)}_{\Omega_{i,j}}\right) = K_p e^{(h,k)}_{\Omega_{i,j}} + K_i\left[e^{(h,k)}_{\Omega_{i,j}} + \sum_{\tau=1}^{k-1} e^{(\tau)}_{\Omega_{i,j}}\right] + K_d\left[e^{(h,k)}_{\Omega_{i,j}} - e^{(k-1)}_{\Omega_{i,j}}\right]$$

wherein, $K_P$ is a proportional control coefficient; $K_i$ is an integral control coefficient; $K_d$ is a differential control coefficient; $e^{(\tau)}_{\Omega_{i,j}}$ is a relative deviation item of a τth outer loop; $e^{(k-1)}_{\Omega_{i,j}}$ is a relative deviation item of a (k−1)th outer loop.

5. The material-based subdomain hybrid cellular automata method for solving the material optimization of the thin-walled frame structures according to claim 4, wherein the following equations are used to select the candidate material closest to the nominal flow stress as the selected material of the current cell by comparing the nominal flow stress with the true flow stress of each material in the candidate material library:

$$\begin{cases} \sigma'^{(h+1,k)}_{\Omega_{i,j}} - \sigma_{fp} = \min\left(\sigma'^{(h+1,k)}_{\Omega_{i,j}} - \sigma_{f1}, ..., \sigma'^{(h+1,k)}_{\Omega_{i,j}} - \sigma_{fs}, ..., \right. \\ \left. \sigma'^{(h+1,k)}_{\Omega_{i,j}} - \sigma_{fl}\right) \\ \sigma^{(h+1,k)}_{\Omega_{i,j}} = \sigma_{fp} \\ Mat^{(h+1,k)}_{\Omega_{i,j}} = Mat(p) \end{cases}$$

wherein, p denotes a position of the selected material in the candidate material library; $\sigma_{fp}$ is an actual flow stress of the selected material; $\sigma_{\Omega_{i,j}}^{(h+1,k)}$ is an actual flow stress of the jth cell in the subdomain $\Omega_i$ in the (h+1)th inner loop and the kth outer loop; Mat(p) denotes the selected material; $\text{Mat}_{\Omega_{i,j}}^{(h+1,k)}$ denotes a selected material of the jth cell in the subdomain $\Omega_i$ in the (h+1)th inner loop and the kth outer loop; $\sigma_s$ is a flow stress of a sth material in the candidate material library.

6. The material-based subdomain hybrid cellular automata method for solving the material optimization of the thin-walled frame structures according to claim 1, wherein the following equation is employed to replace material parameters of the current cell with mechanical parameters of the selected material:

$$\begin{pmatrix} \rho_{\Omega_{i,j}}^{(h+1,k)} \\ E_{\Omega_{i,j}}^{(h+1,k)} \\ \sigma_{y,\Omega_{i,j}}^{(h+1,k)} \\ \sigma_{u,\Omega_{i,j}}^{(h+1,k)} \\ \sigma_{f,\Omega_{i,j}}^{(h+1,k)} \\ \dots \end{pmatrix} = \begin{pmatrix} \rho_p \\ E_p \\ \sigma_{yp} \\ \sigma_{up} \\ \sigma_{fp} \\ \dots \end{pmatrix}$$

wherein, $\rho_{\Omega_{i,j}}^{(h+1,k)}$ is a material density of a jth cell in a subdomain $\Omega_i$ in a (h+1)th inner loop and a kth outer loop; $E_{\Omega_{i,j}}^{(h+1,k)}$ is an elastic modulus of the jth cell in the subdomain $\Omega_i$ in the (h+1)th inner loop and the kth outer loop; $\sigma_{y,\Omega_{i,j}}^{(h+1,k)}$ is a yield tress of the jth cell in the subdomain $\Omega_i$ in the (h+1)th inner loop and the kth outer loop; $\sigma_{u,\Omega_{i,j}}^{(h+1,k)}$ is a tensile strength of the jth cell in the subdomain $\Omega_i$ in the (h+1)th inner loop and the kth outer loop; $\sigma_{f,\Omega_{i,j}}^{(h+1,k)}$ is a flow stress of the jth cell in the subdomain $\Omega_i$ in the (h+1)th inner loop and the kth outer loop; $\rho_p$ is a material density of the selected material; $E_p$ is an elastic modulus of the selected material; $\sigma_{yp}$ is a yield tress of the selected material; $\sigma_{up}$ is a tensile strength of the selected material; $\sigma_{fp}$ is a flow stress of the selected material.

7. The material-based subdomain hybrid cellular automata method for solving the material optimization of the thin-walled frame structures according to claim 1, wherein the global convergence conditions comprise:

$$|C^{(h,k)} - C^{*(k)}| < \varepsilon_1 \text{ or } k_1 \geq k_{1max}$$

wherein, $$C^{(h,k)} = \sum_{i=1}^{I} \sum_{j=1}^{N} C_{\Omega_{i,j}}^{(h,k)}$$

is a total cost in a hth inner loop and a kth outer loop, here $C_{\Omega_{i,j}}^{(h,k)}$ is a cell cost in the hth inner loop and the kth outer loop; $C^{*(k)}$ is a target cost defined in the kth outer loop; $\varepsilon_1$ is an inner loop convergence factor; $k_1$ is a number of iterations in the inner loop; $k_{1max}$ is a maximum number of iterations in the inner loop; a cell cost of the selected material of a jth cell in a subdomain $\Omega_i$ in a (h+1)th inner loop and the kth outer loop $C_{\Omega_{i,j}}^{(h+1,k)}$ is calculated as follows:

$$C_{\Omega_{i,j}}^{(h+1,k)} = \xi_{\Omega_{i,j}}^{(h+1,k)} \rho_{\Omega_{i,j}}^{(h+1,k)} t_{\Omega_{i,j}} A_{\Omega_{i,j}}$$

wherein, $\xi_{\Omega_{i,j}}^{(h+1,k)}$ is a price of the selected material of the jth cell in the subdomain $\Omega_i$ in the (h+1)th inner loop and the kth outer loop, $\rho_{\Omega_{i,j}}^{(h+1,k)}$ is a density of the selected material of the jth cell in the subdomain $\Omega_i$ in the (h+1)th inner loop and the kth outer loop, $t_{\Omega_{i,j}}$ is a thickness of the jth cell in the subdomain $\Omega_i$, and $A_{\Omega_{i,j}}$ is an area of the jth cell in the subdomain $\Omega_i$.

* * * * *